US012762202B2

(12) United States Patent
Tanyer et al.

(10) Patent No.: US 12,762,202 B2
(45) Date of Patent: Oct. 13, 2026

(54) SPARSE ANTENNA ARRAYS FOR AUTOMOTIVE RADAR

(71) Applicant: UHNDER, INC., Austin, TX (US)

(72) Inventors: Suleyman Gokhun Tanyer, Victoria (CA); Paul Dent, Pittsboro, NC (US); Murtaza Ali, Cedar Park, TX (US); Curtis Davis, St. Louis, MO (US)

(73) Assignee: Robert Bosch Gmbh, Gerlingen (DE)

( * ) Notice: Subject to any disclaimer, the term of this patent is extended or adjusted under 35 U.S.C. 154(b) by 442 days.

(21) Appl. No.: 17/582,437

(22) Filed: Jan. 24, 2022

(65) Prior Publication Data

US 2022/0326347 A1 Oct. 13, 2022

Related U.S. Application Data

(60) Provisional application No. 63/140,567, filed on Jan. 22, 2021.

(51) Int. Cl.
*G06F 17/16* (2006.01)
*G01S 7/02* (2006.01)
(Continued)

(52) U.S. Cl.
CPC .............. *G06F 17/16* (2013.01); *G01S 7/023* (2013.01); *G01S 7/0231* (2021.05); (Continued)

(58) Field of Classification Search
CPC ...... G01S 7/023; G01S 7/2813; G01S 7/4004; H04B 1/0057; H04B 1/1081
See application file for complete search history.

(56) References Cited

U.S. PATENT DOCUMENTS

| | | |
|---|---|---|
| 1,882,128 A | 10/1932 | Fearing |
| 3,374,478 A | 3/1968 | Blau |

(Continued)

FOREIGN PATENT DOCUMENTS

| | | |
|---|---|---|
| EP | 0509843 | 10/1992 |
| EP | 1826586 | 8/2007 |

(Continued)

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.

(Continued)

*Primary Examiner* — Resha Desai
*Assistant Examiner* — Brandon James Henson
(74) *Attorney, Agent, or Firm* — Gardner, Linn, Burkhart & Ondersma LLP

(57) ABSTRACT

An exemplary radar sensing system utilizing a sparse array antenna structure provides an enhanced angular resolution to detect multiple targets with improved accuracy beyond the abilities of conventional radar. The exemplary radar system uses sparsely located antenna array elements allowing improved FOV, angular resolution, beam width, and side lobes using fewer physical antenna elements. Sparse antenna arrays allow the use of physically larger elements, larger separation between transmitter and receiver elements to reduce mutual coupling, and fewer elements to reduce necessary computations.

16 Claims, 41 Drawing Sheets
(17 of 41 Drawing Sheet(s) Filed in Color)

(51) Int. Cl.

| | |
|---|---|
| ***G01S 7/28*** | (2006.01) |
| ***G01S 7/35*** | (2006.01) |
| ***G01S 7/40*** | (2006.01) |
| ***G01S 13/931*** | (2020.01) |
| ***G06F 1/10*** | (2006.01) |
| ***G06F 7/48*** | (2006.01) |
| ***G06F 17/14*** | (2006.01) |
| ***H04B 1/00*** | (2006.01) |
| ***H04B 1/10*** | (2006.01) |

(52) U.S. Cl.

CPC .......... *G01S 7/0232* (2021.05); *G01S 7/0234* (2021.05); *G01S 7/0236* (2021.05); *G01S 7/2813* (2013.01); *G01S 7/354* (2013.01); *G01S 7/358* (2021.05); *G01S 7/4004* (2013.01); *G06F 7/4812* (2013.01); *G06F 17/141* (2013.01); *H04B 1/0057* (2013.01); *H04B 1/1081* (2013.01); *G01S 13/931* (2013.01)

(56) References Cited

U.S. PATENT DOCUMENTS 3,735,398 A 5/1973 Ross
3,750,169 A 7/1973 Strenglein
3,766,554 A 10/1973 Tresselt
3,896,434 A 7/1975 Sirven
3,932,871 A 1/1976 Foote
4,078,234 A 3/1978 Fishbein et al.
4,176,351 A 11/1979 Vita et al.
4,308,536 A 12/1981 Sims, Jr. et al.
4,566,010 A 1/1986 Collins
4,612,547 A 9/1986 Itoh
4,882,668 A 11/1989 Schmid et al.
4,910,464 A 3/1990 Trett et al.
4,939,685 A 7/1990 Feintuch
5,001,486 A 3/1991 Bächtiger
5,012,254 A 4/1991 Thompson
5,034,906 A 7/1991 Chang
5,087,918 A 2/1992 May et al.
5,151,702 A 9/1992 Urkowitz
5,175,710 A 12/1992 Hutson
5,218,619 A 6/1993 Dent
5,272,663 A 12/1993 Jones et al.
5,280,288 A 1/1994 Sherry et al.
5,302,956 A 4/1994 Asbury et al.
5,341,141 A 8/1994 Frazier et al.
5,345,470 A 9/1994 Alexander
5,361,072 A 11/1994 Barrick et al.
5,376,939 A 12/1994 Urkowitz
5,379,322 A 1/1995 Kosaka et al.
5,497,162 A 3/1996 Kaiser
5,508,706 A 4/1996 Tsou et al.
5,581,464 A 12/1996 Woll et al.
5,654,715 A 8/1997 Hayashikura et al.
5,657,021 A 8/1997 Ehsani-Nategh et al.
5,657,023 A 8/1997 Lewis et al.
5,682,605 A 10/1997 Salter
5,691,724 A 11/1997 Aker et al.
5,712,640 A 1/1998 Andou
5,724,041 A 3/1998 Inoue et al.
5,847,661 A 12/1998 Ricci
5,892,477 A 4/1999 Wehling
5,917,430 A 6/1999 Greneker, III et al.
5,920,285 A 7/1999 Benjamin
5,931,893 A 8/1999 Dent et al.
5,959,571 A 9/1999 Aoyagi et al.
5,970,400 A 10/1999 Dwyer
6,048,315 A 4/2000 Chiao et al.
6,067,314 A 5/2000 Azuma
6,069,581 A 5/2000 Bell et al.
6,121,872 A 9/2000 Weishaupt
6,121,918 A 9/2000 Tullsson
6,151,366 A 11/2000 Yip
6,163,252 A 12/2000 Nishiwaki
6,184,829 B1 2/2001 Stilp
6,191,726 B1 2/2001 Tullsson
6,208,248 B1 3/2001 Ross
6,288,672 B1 9/2001 Asano et al.
6,307,622 B1 10/2001 Lewis
6,335,700 B1 1/2002 Ashihara
6,347,264 B2 2/2002 Nicosia et al.
6,396,436 B1 5/2002 Lissel et al.
6,400,308 B1 6/2002 Bell et al.
6,411,250 B1 6/2002 Oswald et al.
6,417,796 B1 7/2002 Bowlds
6,424,289 B2 7/2002 Fukae et al.
6,547,733 B2 4/2003 Hwang et al.
6,583,753 B1 6/2003 Reed
6,614,387 B1 9/2003 Deadman
6,624,784 B1 9/2003 Yamaguchi
6,674,908 B1 1/2004 Aronov
6,683,560 B2 1/2004 Bauhahn
6,693,582 B2 2/2004 Steinlechner et al.
6,714,956 B1 3/2004 Liu et al.
6,747,595 B2 6/2004 Hirabe
6,768,391 B1 7/2004 Dent et al.
6,865,218 B1 3/2005 Sourour
6,867,732 B1 3/2005 Chen et al.
6,888,491 B2 5/2005 Richter
6,975,246 B1 12/2005 Trudeau
7,066,886 B2 6/2006 Song et al.
7,119,739 B1 10/2006 Struckman
7,130,663 B2 10/2006 Guo
7,202,776 B2 4/2007 Breed
7,289,058 B2 10/2007 Shima
7,299,251 B2 11/2007 Skidmore et al.
7,338,450 B2 3/2008 Kristofferson et al.
7,395,084 B2 7/2008 Anttila
7,460,055 B2 12/2008 Nishijima et al.
7,474,258 B1 1/2009 Arikan et al.
7,545,310 B2 6/2009 Matsuoka
7,545,321 B2 6/2009 Kawasaki
7,564,400 B2 7/2009 Fukuda
7,567,204 B2 7/2009 Sakamoto
7,609,198 B2 10/2009 Chang
7,642,952 B2 1/2010 Fukuda
7,663,533 B2 2/2010 Toennesen
7,667,637 B2 2/2010 Pedersen et al.
7,728,762 B2 6/2010 Sakamoto
7,791,528 B2 9/2010 Klotzbuecher
7,847,731 B2 12/2010 Wiesbeck et al.
7,855,677 B2 12/2010 Negoro et al.
7,859,450 B2 12/2010 Shirakawa et al.
8,019,352 B2 9/2011 Rappaport et al.
8,044,845 B2 10/2011 Saunders
8,049,663 B2 11/2011 Frank et al.
8,059,026 B1 11/2011 Nunez
8,102,306 B2 1/2012 Smith, Jr. et al.
8,115,672 B2 2/2012 Nouvel et al.
8,154,436 B2 4/2012 Szajnowski
8,169,359 B2 5/2012 Aoyagi
8,212,713 B2 7/2012 Aiga et al.
8,330,650 B2 12/2012 Goldman
8,390,507 B2 3/2013 Wintermantel
8,471,760 B2 6/2013 Szajnowski
8,532,159 B2 9/2013 Kagawa et al.
8,547,988 B2 10/2013 Hadani et al.
8,686,894 B2 4/2014 Fukuda et al.
8,694,306 B1 4/2014 Short et al.
8,994,581 B1 3/2015 Brown
9,121,943 B2 9/2015 Stirlin-Gallacher et al.
9,182,479 B2 11/2015 Chen et al.
9,239,378 B2 1/2016 Kishigami et al.
9,239,379 B2 1/2016 Burgio et al.
9,274,217 B2 3/2016 Chang et al.
9,282,945 B2 3/2016 Smith et al.
9,335,402 B2 5/2016 Maeno et al.
9,400,328 B2 7/2016 Hsiao et al.
9,541,639 B2 1/2017 Searcy et al.
9,568,600 B2 2/2017 Alland
9,575,160 B1 2/2017 Davis et al.
9,599,702 B1 3/2017 Bordes et al.

(56) References Cited

U.S. PATENT DOCUMENTS

| | | | | |
|---|---|---|---|---|
| 9,689,967 | B1 | 6/2017 | Stark et al. | |
| 9,720,073 | B1 | 8/2017 | Davis et al. | |
| 9,720,080 | B1 | 8/2017 | Rodenbeck | |
| 9,753,121 | B1 | 9/2017 | Davis | |
| 9,753,132 | B1 | 9/2017 | Bordes et al. | |
| 9,772,397 | B1 | 9/2017 | Bordes et al. | |
| 9,791,551 | B1 | 10/2017 | Eshraghi et al. | |
| 9,791,564 | B1 | 10/2017 | Harris et al. | |
| 9,806,914 | B1 | 10/2017 | Bordes et al. | |
| 9,829,567 | B1 | 11/2017 | Davis et al. | |
| 9,846,228 | B2 | 12/2017 | Davis et al. | |
| 9,869,762 | B1 | 1/2018 | Alland et al. | |
| 9,954,955 | B2 | 4/2018 | Davis et al. | |
| 9,989,627 | B2 | 6/2018 | Eshraghi et al. | |
| 10,090,585 | B2 | 10/2018 | Dinc et al. | |
| 10,092,192 | B2 | 10/2018 | Lashkari et al. | |
| 10,215,853 | B2 | 2/2019 | Stark et al. | |
| 10,305,611 | B1 | 5/2019 | Rimini et al. | |
| 10,371,797 | B1 * | 8/2019 | Prados | G01S 13/86 |
| 10,536,529 | B2 | 1/2020 | Davis et al. | |
| 10,852,408 | B2 | 12/2020 | Aslett et al. | |
| 11,105,890 | B2 | 8/2021 | Behrens et al. | |
| 11,271,328 | B2 | 3/2022 | Liu et al. | |
| 2001/0002919 | A1 | 6/2001 | Sourour et al. | |
| 2002/0004692 | A1 | 1/2002 | Nicosia et al. | |
| 2002/0044082 | A1 | 4/2002 | Woodington et al. | |
| 2002/0075178 | A1 | 6/2002 | Woodington et al. | |
| 2002/0118522 | A1 | 8/2002 | Ho et al. | |
| 2002/0130811 | A1 | 9/2002 | Voigtlaender | |
| 2002/0147534 | A1 | 10/2002 | Delcheccolo et al. | |
| 2002/0155811 | A1 | 10/2002 | Prismantas | |
| 2003/0001772 | A1 | 1/2003 | Woodington et al. | |
| 2003/0011519 | A1 | 1/2003 | Breglia et al. | |
| 2003/0058166 | A1 | 3/2003 | Hirabe | |
| 2003/0073463 | A1 | 4/2003 | Shapira | |
| 2003/0080713 | A1 | 5/2003 | Kirmuss | |
| 2003/0102997 | A1 | 6/2003 | Levin et al. | |
| 2003/0164791 | A1 | 9/2003 | Shinoda et al. | |
| 2003/0235244 | A1 | 12/2003 | Pessoa et al. | |
| 2004/0012516 | A1 | 1/2004 | Schiffmann | |
| 2004/0015529 | A1 | 1/2004 | Tanrikulu et al. | |
| 2004/0066323 | A1 | 4/2004 | Richter | |
| 2004/0070532 | A1 | 4/2004 | Ishii et al. | |
| 2004/0107030 | A1 | 6/2004 | Nishira et al. | |
| 2004/0138802 | A1 | 7/2004 | Kuragaki et al. | |
| 2004/0215373 | A1 | 10/2004 | Won et al. | |
| 2004/0229590 | A1 | 11/2004 | Kubo et al. | |
| 2005/0008065 | A1 | 1/2005 | Schilling | |
| 2005/0069162 | A1 | 3/2005 | Haykin | |
| 2005/0090274 | A1 | 4/2005 | Miyashita | |
| 2005/0156780 | A1 | 7/2005 | Bonthron et al. | |
| 2005/0201457 | A1 | 9/2005 | Allred et al. | |
| 2005/0225476 | A1 | 10/2005 | Hoetzel et al. | |
| 2005/0273480 | A1 | 12/2005 | Pugh et al. | |
| 2006/0012511 | A1 | 1/2006 | Dooi et al. | |
| 2006/0036353 | A1 | 2/2006 | Wintermantel | |
| 2006/0050707 | A1 | 3/2006 | Sterin | |
| 2006/0093078 | A1 | 5/2006 | Lewis et al. | |
| 2006/0109170 | A1 | 5/2006 | Voigtlaender et al. | |
| 2006/0109931 | A1 | 5/2006 | Asai | |
| 2006/0114324 | A1 | 6/2006 | Farmer et al. | |
| 2006/0140249 | A1 | 6/2006 | Kohno | |
| 2006/0181448 | A1 | 8/2006 | Natsume et al. | |
| 2006/0220943 | A1 | 10/2006 | Schlick et al. | |
| 2006/0244653 | A1 | 11/2006 | Szajnowski | |
| 2006/0262007 | A1 | 11/2006 | Bonthron | |
| 2006/0262009 | A1 | 11/2006 | Watanabe | |
| 2007/0018884 | A1 | 1/2007 | Adams | |
| 2007/0018886 | A1 | 1/2007 | Watanabe et al. | |
| 2007/0096885 | A1 | 5/2007 | Cheng et al. | |
| 2007/0109175 | A1 | 5/2007 | Fukuda | |
| 2007/0115869 | A1 | 5/2007 | Lakkis | |
| 2007/0120731 | A1 | 5/2007 | Kelly, Jr. et al. | |
| 2007/0132633 | A1 | 6/2007 | Uchino | |
| 2007/0152870 | A1 | 7/2007 | Woodington et al. | |
| 2007/0152871 | A1 | 7/2007 | Puglia | |
| 2007/0152872 | A1 | 7/2007 | Woodington | |
| 2007/0164896 | A1 | 7/2007 | Suzuki et al. | |
| 2007/0171122 | A1 | 7/2007 | Nakano | |
| 2007/0182619 | A1 | 8/2007 | Honda et al. | |
| 2007/0182623 | A1 | 8/2007 | Zeng | |
| 2007/0188373 | A1 | 8/2007 | Shirakawa et al. | |
| 2007/0200747 | A1 | 8/2007 | Okai | |
| 2007/0263748 | A1 | 11/2007 | Mesecher | |
| 2007/0279303 | A1 | 12/2007 | Schoebel | |
| 2008/0080599 | A1 | 4/2008 | Kang | |
| 2008/0088499 | A1 | 4/2008 | Bonthron | |
| 2008/0094274 | A1 | 4/2008 | Nakanishi | |
| 2008/0150790 | A1 | 6/2008 | Voigtlaender et al. | |
| 2008/0180311 | A1 | 7/2008 | Mikami | |
| 2008/0208472 | A1 | 8/2008 | Morcom | |
| 2008/0218406 | A1 | 9/2008 | Nakanishi | |
| 2008/0258964 | A1 | 10/2008 | Schoeberl | |
| 2008/0272955 | A1 | 11/2008 | Yonak et al. | |
| 2009/0003412 | A1 | 1/2009 | Negoro et al. | |
| 2009/0015459 | A1 | 1/2009 | Mahler et al. | |
| 2009/0015464 | A1 | 1/2009 | Fukuda | |
| 2009/0027257 | A1 | 1/2009 | Arikan | |
| 2009/0046000 | A1 | 2/2009 | Matsuoka | |
| 2009/0051581 | A1 | 2/2009 | Hatono | |
| 2009/0072957 | A1 | 3/2009 | Wu et al. | |
| 2009/0073025 | A1 | 3/2009 | Inoue et al. | |
| 2009/0074031 | A1 | 3/2009 | Fukuda | |
| 2009/0079617 | A1 | 3/2009 | Shirakawa et al. | |
| 2009/0085827 | A1 | 4/2009 | Orime et al. | |
| 2009/0103593 | A1 | 4/2009 | Bergamo | |
| 2009/0121918 | A1 | 5/2009 | Shirai et al. | |
| 2009/0212998 | A1 | 8/2009 | Szajnowski | |
| 2009/0237293 | A1 | 9/2009 | Sakuma | |
| 2009/0254260 | A1 | 10/2009 | Nix et al. | |
| 2009/0267822 | A1 | 10/2009 | Shinoda et al. | |
| 2009/0289831 | A1 | 11/2009 | Akita | |
| 2009/0295623 | A1 | 12/2009 | Falk | |
| 2010/0001897 | A1 | 1/2010 | Lyman | |
| 2010/0019950 | A1 | 1/2010 | Yamano et al. | |
| 2010/0039311 | A1 | 2/2010 | Woodington et al. | |
| 2010/0039313 | A1 | 2/2010 | Morris | |
| 2010/0116365 | A1 | 5/2010 | McCarty | |
| 2010/0156690 | A1 | 6/2010 | Kim et al. | |
| 2010/0166121 | A1 | 7/2010 | Kenney, Jr. | |
| 2010/0198513 | A1 | 8/2010 | Zeng et al. | |
| 2010/0202495 | A1 | 8/2010 | Kagawa et al. | |
| 2010/0253573 | A1 | 10/2010 | Holzheimer et al. | |
| 2010/0277359 | A1 | 11/2010 | Ando | |
| 2010/0289692 | A1 | 11/2010 | Winkler | |
| 2011/0006944 | A1 | 1/2011 | Goldman | |
| 2011/0032138 | A1 | 2/2011 | Krapf | |
| 2011/0074620 | A1 | 3/2011 | Wintermantel | |
| 2011/0187600 | A1 | 8/2011 | Landt | |
| 2011/0196568 | A1 | 8/2011 | Nickolaou | |
| 2011/0234448 | A1 | 9/2011 | Hayase | |
| 2011/0248796 | A1 | 10/2011 | Pozgay | |
| 2011/0279303 | A1 | 11/2011 | Smith, Jr. et al. | |
| 2011/0279307 | A1 | 11/2011 | Song | |
| 2011/0285576 | A1 | 11/2011 | Lynam | |
| 2011/0291874 | A1 | 12/2011 | De Mersseman | |
| 2011/0291875 | A1 | 12/2011 | Szajnowski | |
| 2011/0292971 | A1 | 12/2011 | Hadani et al. | |
| 2011/0298653 | A1 | 12/2011 | Mizutani | |
| 2012/0001791 | A1 | 1/2012 | Wintermantel | |
| 2012/0050092 | A1 | 3/2012 | Lee et al. | |
| 2012/0050093 | A1 | 3/2012 | Heilmann et al. | |
| 2012/0105268 | A1 | 5/2012 | Smits et al. | |
| 2012/0112957 | A1 | 5/2012 | Nguyen et al. | |
| 2012/0133547 | A1 | 5/2012 | MacDonald et al. | |
| 2012/0146834 | A1 | 6/2012 | Karr | |
| 2012/0173246 | A1 | 7/2012 | Choi et al. | |
| 2012/0195349 | A1 | 8/2012 | Lakkis | |
| 2012/0249356 | A1 | 10/2012 | Shope | |
| 2012/0257643 | A1 | 10/2012 | Wu et al. | |
| 2012/0283987 | A1 | 11/2012 | Busking et al. | |
| 2012/0314799 | A1 | 12/2012 | In De Betou et al. | |
| 2012/0319900 | A1 | 12/2012 | Johansson et al. | |
| 2013/0016761 | A1 | 1/2013 | Nentwig | |

(56) References Cited

U.S. PATENT DOCUMENTS

| | | | | |
|---|---|---|---|---|
| 2013/0021196 | A1 | 1/2013 | Himmelstoss | |
| 2013/0027240 | A1 | 1/2013 | Chowdhury | |
| 2013/0057436 | A1 | 3/2013 | Krasner et al. | |
| 2013/0069818 | A1 | 3/2013 | Shirakawa et al. | |
| 2013/0102254 | A1 | 4/2013 | Cyzs | |
| 2013/0113647 | A1 | 5/2013 | Sentelle et al. | |
| 2013/0113652 | A1 | 5/2013 | Smits et al. | |
| 2013/0113653 | A1 | 5/2013 | Kishigami et al. | |
| 2013/0135140 | A1 | 5/2013 | Kishigami | |
| 2013/0169468 | A1 | 7/2013 | Johnson et al. | |
| 2013/0169485 | A1 | 7/2013 | Lynch | |
| 2013/0176154 | A1 | 7/2013 | Bonaccio et al. | |
| 2013/0214961 | A1 | 8/2013 | Lee et al. | |
| 2013/0229301 | A1 | 9/2013 | Kanamoto | |
| 2013/0244710 | A1 | 9/2013 | Nguyen et al. | |
| 2013/0249730 | A1 | 9/2013 | Adcook | |
| 2013/0314271 | A1 | 11/2013 | Braswell et al. | |
| 2013/0321196 | A1 | 12/2013 | Binzer et al. | |
| 2014/0022108 | A1 | 1/2014 | Alberth, Jr. et al. | |
| 2014/0028491 | A1 | 1/2014 | Ferguson | |
| 2014/0035774 | A1 | 2/2014 | Khlifi | |
| 2014/0049423 | A1 | 2/2014 | De Jong et al. | |
| 2014/0070985 | A1 | 3/2014 | Vacanti | |
| 2014/0085128 | A1 | 3/2014 | Kishigami et al. | |
| 2014/0097987 | A1 | 4/2014 | Worl et al. | |
| 2014/0111367 | A1 | 4/2014 | Kishigami et al. | |
| 2014/0111372 | A1 | 4/2014 | Wu | |
| 2014/0139322 | A1 | 5/2014 | Wang et al. | |
| 2014/0159948 | A1 | 6/2014 | Ishimori et al. | |
| 2014/0168004 | A1 | 6/2014 | Chen et al. | |
| 2014/0220903 | A1 | 8/2014 | Schulz et al. | |
| 2014/0253345 | A1 | 9/2014 | Breed | |
| 2014/0253364 | A1 | 9/2014 | Lee et al. | |
| 2014/0285373 | A1 | 9/2014 | Kuwahara et al. | |
| 2014/0316261 | A1 | 10/2014 | Lux et al. | |
| 2014/0327566 | A1 | 11/2014 | Burgio et al. | |
| 2014/0340254 | A1 | 11/2014 | Hesse | |
| 2014/0348253 | A1 | 11/2014 | Mobasher et al. | |
| 2014/0350815 | A1 | 11/2014 | Kambe | |
| 2015/0002329 | A1 | 1/2015 | Murad et al. | |
| 2015/0002357 | A1 | 1/2015 | Sanford et al. | |
| 2015/0035662 | A1 | 2/2015 | Bowers et al. | |
| 2015/0061922 | A1 | 3/2015 | Kishigami | |
| 2015/0103745 | A1 | 4/2015 | Negus et al. | |
| 2015/0153445 | A1 | 6/2015 | Jansen | |
| 2015/0160335 | A1 | 6/2015 | Lynch et al. | |
| 2015/0198709 | A1 | 7/2015 | Inoue | |
| 2015/0204966 | A1 | 7/2015 | Kishigami | |
| 2015/0204971 | A1 | 7/2015 | Yoshimura et al. | |
| 2015/0204972 | A1 | 7/2015 | Kuehnle et al. | |
| 2015/0226838 | A1 | 8/2015 | Hayakawa | |
| 2015/0226848 | A1 | 8/2015 | Park | |
| 2015/0234045 | A1 | 8/2015 | Rosenblum | |
| 2015/0247924 | A1 | 9/2015 | Kishigami | |
| 2015/0255867 | A1 | 9/2015 | Inoue | |
| 2015/0301172 | A1 | 10/2015 | Ossowska | |
| 2015/0323660 | A1 | 11/2015 | Hampikian | |
| 2015/0331090 | A1 | 11/2015 | Jeong et al. | |
| 2015/0369912 | A1 | 12/2015 | Kishigami et al. | |
| 2015/0373167 | A1 | 12/2015 | Murashov et al. | |
| 2016/0003938 | A1 | 1/2016 | Gazit et al. | |
| 2016/0003939 | A1 | 1/2016 | Stainvas Olshansky et al. | |
| 2016/0018511 | A1 | 1/2016 | Nayyar et al. | |
| 2016/0025844 | A1 | 1/2016 | Mckitterick et al. | |
| 2016/0033623 | A1 | 2/2016 | Holder | |
| 2016/0033631 | A1 | 2/2016 | Searcy et al. | |
| 2016/0033632 | A1 | 2/2016 | Searcy et al. | |
| 2016/0041260 | A1 | 2/2016 | Cao et al. | |
| 2016/0054441 | A1 | 2/2016 | Kuo et al. | |
| 2016/0061935 | A1 | 3/2016 | McCloskey et al. | |
| 2016/0084941 | A1 | 3/2016 | Arage | |
| 2016/0084943 | A1 | 3/2016 | Arage | |
| 2016/0091595 | A1 | 3/2016 | Alcalde | |
| 2016/0103206 | A1 | 4/2016 | Pavao-Moreira et al. | |
| 2016/0124075 | A1 | 5/2016 | Vogt et al. | |
| 2016/0124086 | A1 | 5/2016 | Jansen et al. | |
| 2016/0131752 | A1 | 5/2016 | Jansen et al. | |
| 2016/0139254 | A1 | 5/2016 | Wittenberg | |
| 2016/0146931 | A1 | 5/2016 | Rao et al. | |
| 2016/0154103 | A1 | 6/2016 | Moriuchi | |
| 2016/0157828 | A1 | 6/2016 | Sumi et al. | |
| 2016/0178732 | A1 | 6/2016 | Oka et al. | |
| 2016/0213258 | A1 | 7/2016 | Lashkari et al. | |
| 2016/0223644 | A1 | 8/2016 | Soga | |
| 2016/0238694 | A1 | 8/2016 | Kishigami | |
| 2016/0245909 | A1 | 8/2016 | Aslett et al. | |
| 2016/0349365 | A1 | 12/2016 | Ling | |
| 2017/0010361 | A1 | 1/2017 | Tanaka | |
| 2017/0023661 | A1 | 1/2017 | Richert | |
| 2017/0023663 | A1 | 1/2017 | Subburaj et al. | |
| 2017/0074980 | A1 | 3/2017 | Adib | |
| 2017/0090015 | A1 | 3/2017 | Breen et al. | |
| 2017/0117950 | A1 | 4/2017 | Strong | |
| 2017/0153316 | A1 | 6/2017 | Wintermantel | |
| 2017/0176583 | A1 | 6/2017 | Gulden et al. | |
| 2017/0212213 | A1 | 7/2017 | Kishigami | |
| 2017/0219689 | A1 | 8/2017 | Hung et al. | |
| 2017/0234968 | A1 | 8/2017 | Roger et al. | |
| 2017/0293025 | A1 | 10/2017 | Davis et al. | |
| 2017/0293027 | A1 | 10/2017 | Stark et al. | |
| 2017/0307728 | A1 | 10/2017 | Eshraghi et al. | |
| 2017/0309997 | A1 | 10/2017 | Alland et al. | |
| 2017/0310758 | A1 | 10/2017 | Davis et al. | |
| 2017/0315221 | A1* | 11/2017 | Cohen ..................... | G01S 13/42 |
| 2017/0336495 | A1 | 11/2017 | Davis et al. | |
| 2018/0003799 | A1 | 1/2018 | Yang et al. | |
| 2018/0019755 | A1 | 1/2018 | Josefsberg et al. | |
| 2018/0074168 | A1 | 3/2018 | Subburaj et al. | |
| 2018/0095163 | A1 | 4/2018 | Lovberg et al. | |
| 2018/0113191 | A1 | 4/2018 | Villeval et al. | |
| 2018/0115371 | A1 | 4/2018 | Trotta et al. | |
| 2018/0149730 | A1 | 5/2018 | Li et al. | |
| 2018/0149736 | A1* | 5/2018 | Alland .................. | H01Q 21/28 |
| 2018/0175907 | A1 | 6/2018 | Marr | |
| 2018/0252809 | A1 | 9/2018 | Davis et al. | |
| 2018/0294908 | A1 | 10/2018 | Abdelmonem | |
| 2018/0358706 | A1 | 12/2018 | Kildal et al. | |
| 2018/0372837 | A1* | 12/2018 | Bily ........................ | G01S 7/032 |
| 2019/0064364 | A1 | 2/2019 | Boysel et al. | |
| 2019/0072641 | A1 | 3/2019 | Al-Stouhi et al. | |
| 2019/0178983 | A1 | 6/2019 | Lin et al. | |
| 2019/0219685 | A1 | 7/2019 | Shan | |
| 2019/0324134 | A1 | 10/2019 | Cattle | |
| 2019/0383929 | A1 | 12/2019 | Melzer et al. | |
| 2020/0003884 | A1 | 1/2020 | Arkind et al. | |
| 2020/0064455 | A1 | 2/2020 | Schroder et al. | |
| 2020/0158861 | A1* | 5/2020 | Cattle .................. | G01S 13/345 |
| 2020/0191939 | A1 | 6/2020 | Wu et al. | |
| 2020/0292666 | A1 | 9/2020 | Maher et al. | |

FOREIGN PATENT DOCUMENTS

| | | |
|---|---|---|
| EP | 0725480 | 11/2011 |
| EP | 2374217 | 4/2013 |
| EP | 2884299 | 6/2015 |
| EP | 2821808 | 7/2015 |
| FR | 2751086 | 1/1998 |
| JP | 2010243330 | 10/2010 |
| KR | 101010522 | 1/2011 |
| WO | WO2008022981 | 2/2008 |
| WO | WO2015175078 | 11/2015 |
| WO | WO2015185058 | 12/2015 |
| WO | WO2016011407 | 1/2016 |
| WO | WO2016030656 | 3/2016 |
| WO | WO2017059961 | 4/2017 |
| WO | WO2017175190 | 10/2017 |
| WO | WO2017187330 | 11/2017 |

OTHER PUBLICATIONS

Fraser, "Design and simulation of a coded sequence ground penetrating radar," In: Diss. University of British Columbia, Dec. 3, 2015.

(56) References Cited

OTHER PUBLICATIONS

Zhou et al., "Linear extractors for extracting randomness from noisy sources," In: Information Theory Proceedings (ISIT), 2011 IEEE International Symposium on Oct. 3, 2011.
V. Giannini et al., "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014. (Year: 2014).
Óscar Faus García, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.
Levanan Nadav et al., "Non-coherent pulse compression—aperiodic and periodic waveforms", IET Radar, Sonar & Navagation, The Institution of Engineering and Technology, Jan. 1, 2016, pp. 216-224, vol. 10, Iss. 1, UK.
Akihiro Kajiwara, "Stepped-FM Pulse Radar for Vehicular Collision Avoidance", Electronics and Communications in Japan, Part 1, Mar. 1998, pp. 234-239, vol. 82, No. 6 1999.
A. Bourdoux, U. Ahamd, D. Guermandi, S. Brebels, A. Dewilde, W. Van Thillo, PMCW "Waveform and MIMO Technique for a 79 GHz CMOS Automotive Radar", 2016 IEEE Radar Conference (RadarConf), 2016, pp. 1-5, doi: 10.1109/RADAR.2016.7485114. (Year: 2016).
V. Jain, F. Tzeng, L. Zhou and P. Heydari, "A single-Chip Dual-Band 22-29-GHz/77-81-GHz BiCMOS Transceiver for Automotive Radars," in IEEE Journal of Solid-State Circuits, vol. 44, No. 12, pp. 3469-3485, Dec. 2009, doi: 10.1109/JSSC.2009.2032583. (Year: 2009).
A. Medra et al., "An 80 GHz Low-Noise Amplifier Resilient to the TX Spillover in Phase-Modulated Continuous-Wave Radars," In IEEE Journal of Solid-State Circuits, vol. 51, No. 5, pp. 1141-1153, May 2016, doi: 10.1109/JSSC.2016.2520962. (Year: 2016).
International Search Report and Written Opinion from corresponding Patent Cooperation Treaty (PCT) Application No. PCT/IB22/50600, completed Feb. 8, 2023.
Article An MIMO Radar System Based on the Sparse-Array and Its Frequency Migration Calibration Method, Published Aug. 17, 2019.

* cited by examiner

FIG. 13B (an enlarged portion of FIG. 13A)

FIG. 13D (an enlarged portion of FIG. 13C)

SPARSE ANTENNA ARRAYS FOR AUTOMOTIVE RADAR

CROSS REFERENCE TO RELATED APPLICATIONS

The present application claims the filing benefits of U.S. provisional application, Ser. No. 63/140,567, filed Jan. 22, 2021, which is hereby incorporated by reference herein in its entirety.

FIELD OF THE INVENTION

The present invention is directed to radar systems, and more particularly to radar systems for vehicles and robotics.

BACKGROUND OF THE INVENTION

The use of radar to determine direction, range, and velocity of objects in an environment is important in a number of applications including automotive radar, robotic sensing, and positioning. The performance of high-resolution radars can be limited by the contrast ratio, accuracy, and presence of ghost targets experienced using standard processing chains.

Radar systems typically transmit a radio frequency (RF) signal and listen for the reflection of the radio signal from objects in the environment. A radar system estimates the location of objects, also called targets, in the environment by correlating delayed versions of the received radio signal with the transmitted radio signal. A radar system can also estimate the velocity of the target by Doppler processing. A radar system with multiple transmitters and multiple receivers (MIMO: Multi-Input Multi-Output) can also determine the angular position of a target. Depending on antenna scanning and/or the number of antenna/receiver channels, the number of antenna elements and their physical locations and their geometry, different angles (e.g., azimuth or elevation) can be determined.

A radar system consists of transmitters and receivers. The transmitters generate a baseband signal which is upconverted to a radio frequency (RF) signal that propagates according to an antenna pattern. The transmitted signal is reflected off of object or targets in the environment. The received signal at each receiver is the totality of the reflected signal from all targets in the environment. The receiver downconverts the received signal to baseband and compares the baseband received signal to the baseband signal at one or more transmitters. This is used to determine the range, velocity, and angle of targets in the environment.

A radar system utilizes multiple antenna elements to form antenna arrays for transmitting and receiving purposes. Radar systems often detect false targets due to antenna pattern side lobes which are artificially created targets due to geometry of antenna array.

SUMMARY OF THE INVENTION

Methods and systems of the present invention provide for a radar system utilizing a sparse array antenna structure which provides an enhanced angular resolution to detect multiple targets with improved accuracy beyond the abilities of conventional radar.

A radar system for a robot or vehicle that uses such an enhanced resolution in accordance with the present invention includes multiple antenna array elements at least for transmission and/or receiving. The transmitter is operable to or configured to transmit radio signals. The receiver is operable to or configured to receive a reflected radio signal. The reflected radio signal is the transmitted radio signal(s) reflected from an object or multiple objects.

A radar system comprises an array of transmit antennas and receive antennas connected to a signal processing circuit. In one implementation the antenna arrays may be linear to provide radar target resolution only in azimuth (horizontal axis) while in other implementations the antenna arrays may be two-dimensional and provide target resolution in both azimuth and elevation (vertical axis), separately.

Each transmit array antenna is connected to an associated transmitter and each receive array antenna is connected to an associated receiver, each receiver comprising low-noise amplification, downconversion to the quadrature (IQ) baseband using I-Q mixers driven by a common local oscillator, baseband filtering as necessary, programmable gain adjustment as necessary, and digital-to-analog (D-to-A) conversion at an sampling rate adequate to capture all spectral components of interest.

After D-to-A conversion, each receiver's processing correlates its received signal samples with digital values representing each transmitter's modulation to produce a different number/set of correlations corresponding to different echo delays. There exists one set of such for each receiver-transmitter combination, a number in total equal to the product of the number of transmit antennas with the number of receive antennas.

A radar system utilizes an antenna array which is time shared between a transmitter and a receiver. Output of the receiver is utilized for control and processing and to produce display data.

Radar system utilizes antenna arrays for transmitting and receiving signals which together larger virtual arrays are formed. Virtual array geometry determines field of view (FOV) of radar. FOV defines the extent of the angular region of radar operation. FOV angles are measured with reference to broadside direction. FOV can be defined as a one-sided or two-sided angular extent from broadside in azimuth and elevation. One-sided FOV designated by simply FOV if side convention is not mentioned.

Radar system utilizes antenna array elements which are designed to have a minimum separation distance (spacing) which determines angular resolution of radar. Spacing values are limited by physical size of elements.

Usable field of view (UFOV) maximum angular extent with no grating lobe effects. In general sense, some radar specifications might use only a portion of available FOV for which actual FOV is selected to be smaller than usable FOV. However, without any loss of generality, herein all exemplary radars have FOVs equal to usable FOV to avoid any misunderstanding.

Radar performance deteriorates when there is mutual coupling between antenna array elements. Mutual coupling occurs when two array elements are physically close to each other which coupling among transmitters can be compensated digitally. Similar compensation is possible for receiver groups. Further mutual coupling occurs especially when transmitter element radiates, and neighboring receiver receives that signal in close range on array aperture.

In an aspect of the present invention, an exemplary radar system uses sparsely located antenna array elements allowing improved FOV, angular resolution, beam width, and side lobes using fewer physical antenna elements. Sparse antenna arrays allow the use of physically larger elements, larger separation between transmitter and receiver elements to reduce mutual coupling, and fewer elements to reduce necessary computations.

To improve radar performance parameters; FOV, BW, angular resolution, and maximum side lobe level for a given processing complexity according to one aspect of this invention, the transmit and receive antenna arrays are configured such that the corresponding virtual elements are spread irregularly in the azimuthal and elevation directions in order to minimize sidelobes. Spreading allows physically large elements to be positioned with no overlaps on grids formed by a minimum spacing value of design which could well be smaller than this physical size. Total number of virtual elements can be spread to a much larger aperture to increase angular resolution. Transmitter and receiver groups can be separated on antenna aperture to reduce mutual coupling.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 13A, 13B, 13C, and 13D are diagrams of antenna patterns illustrating the improved sparse array is further improved by suppression of side lobes using differential beamforming technique in an embodiment of the present invention;

DETAILED DESCRIPTION

Figure 1A:
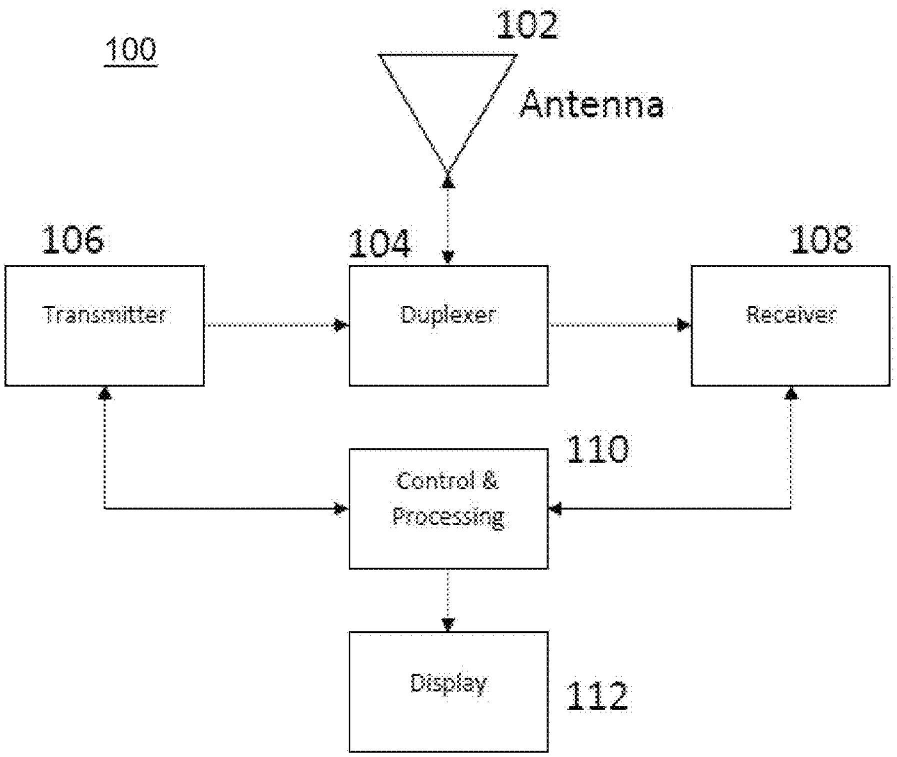
FIGS. 1A and 1B are block diagrams of radar systems in accordance with the present invention.

An exemplary radar system 100 with an antenna 102 is illustrated in FIG. 1A that is time-shared between a transmitter 106 and a receiver 108 via a duplexer 104. As also illustrated in FIG. 1A, output from the receiver 108 is received by a control and processing module 110 that processes the output from the receiver 108 to produce display data for the display 112. The control and processing module 110 is also operable to produce a radar data output that is provided to other control units. The control and processing module 110 is also operable to control the transmitter 106.

Figure 1B:
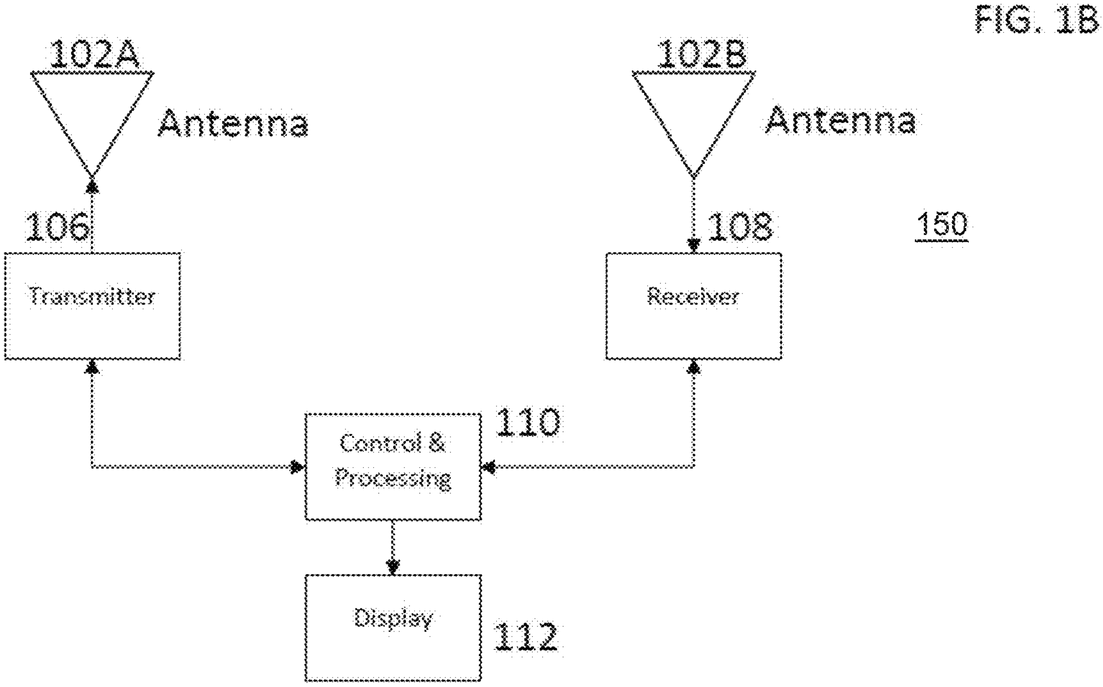

An alternative exemplary radar system 150 with a pair of antennas 102*a*, 102*b* is illustrated in FIG. 1B: an antenna 102*a* for the transmitter 106 and another antenna 102*b* for the receiver 108.

Figure 2:
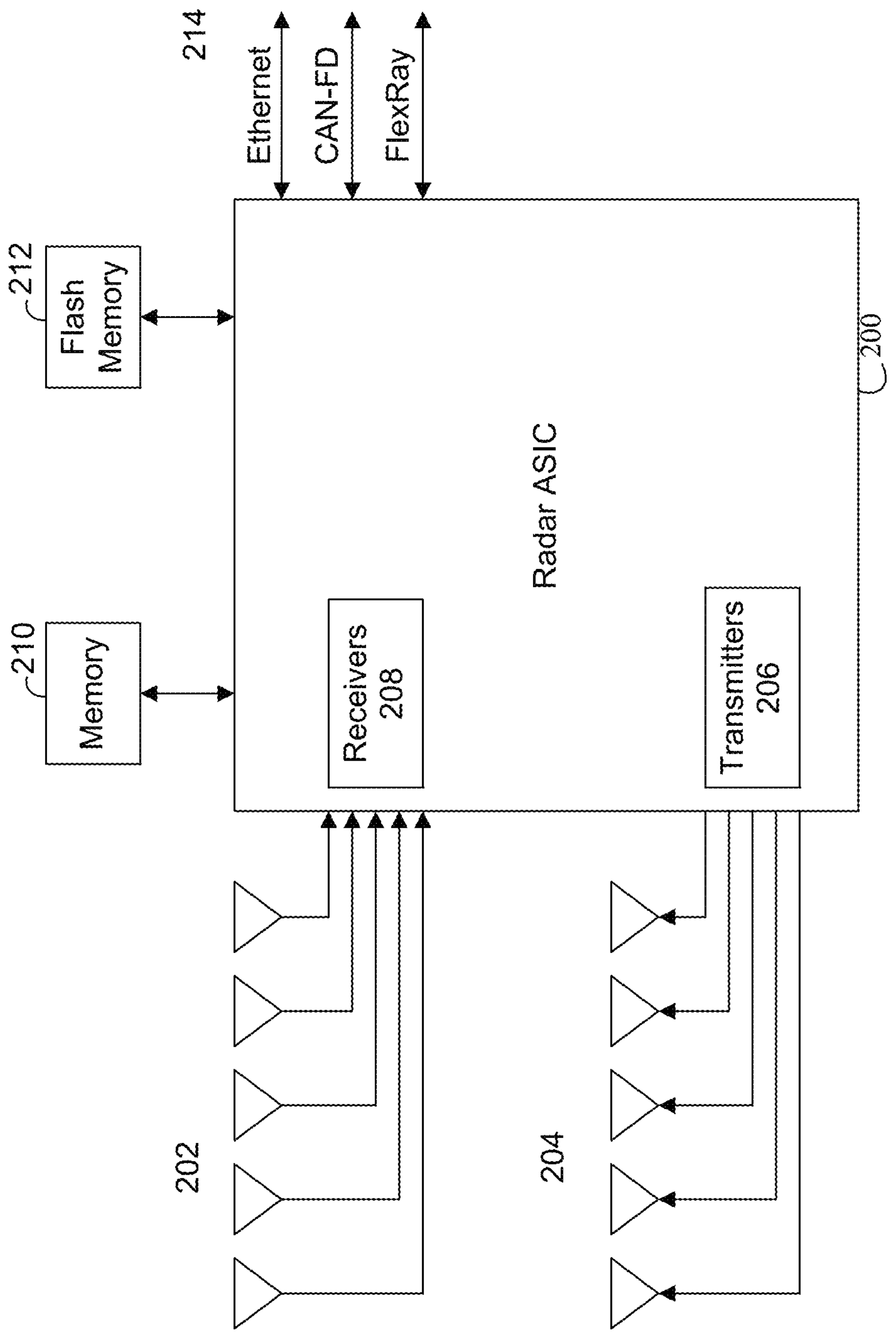
FIG. 2 is a block diagram illustrating a radar system with a plurality of receivers and a plurality of transmitters (MIMO radar) in accordance with the present invention.

An exemplary MIMO radar system 200 with multiple antennas 202, 204, multiple transmitters 206, and multiple receivers 208 is illustrated in FIG. 2. Using multiple antennas 202, 204 allows an exemplary radar system 200 to determine the angle (azimuth or elevation or both) of targets in the environment. Depending on the geometry of the antenna system, different angles (e.g., azimuth or elevation) can be determined.

The radar system 200 may be connected to a network via an Ethernet connection or other types of network connections 214, such as, for example, CAN-FD and FlexRay. The radar system 200 may also have memory (210, 212) to store software used for processing the signals in order to determine range, velocity, and location of targets/objects. Memory 210, 212 may also be used to store information about targets in the environment. There may also be processing capability contained in the radar application specific integrated circuit (ASIC) apart from the transmitters 206 and receivers 208.

With MIMO radar systems, each transmitter signal is rendered distinguishable from every other transmitter by using appropriate differences in the modulation, for example, different digital code sequences. Each receiver correlates with each transmitter signal, producing a number of correlated outputs equal to the product of the number of receivers with the number of transmitters. The outputs are deemed to have been produced by a number of virtual receivers, which can exceed the number of physical receivers.

A transmit signal echoed from a reflecting object, and received and correlated by a receiver results in a digitized radar echo signal that is the same as would have been produced by a transmit and receive antenna co-located at coordinates which are the sum of the actual transmit and receive antenna coordinates; such signals, called Virtual Receiver (VRX) signals, are further combined according to delay and Doppler shift to resolve targets in the four dimensions of azimuth, elevation, range, and Doppler. Denoting $N_{tx}$ and $N_{rx}$ for number of transmitters (TX), and receivers, respectively will create $N_{vrx}=N_{tx}N_{rx}$ virtual receivers. An exemplary advanced driver-assistance systems (ADAS) coordinate reference system for an antenna array is given in FIG. 3. An exemplary physical and virtual positions for a linear array are illustrated in FIG. 4.

Figure 3:
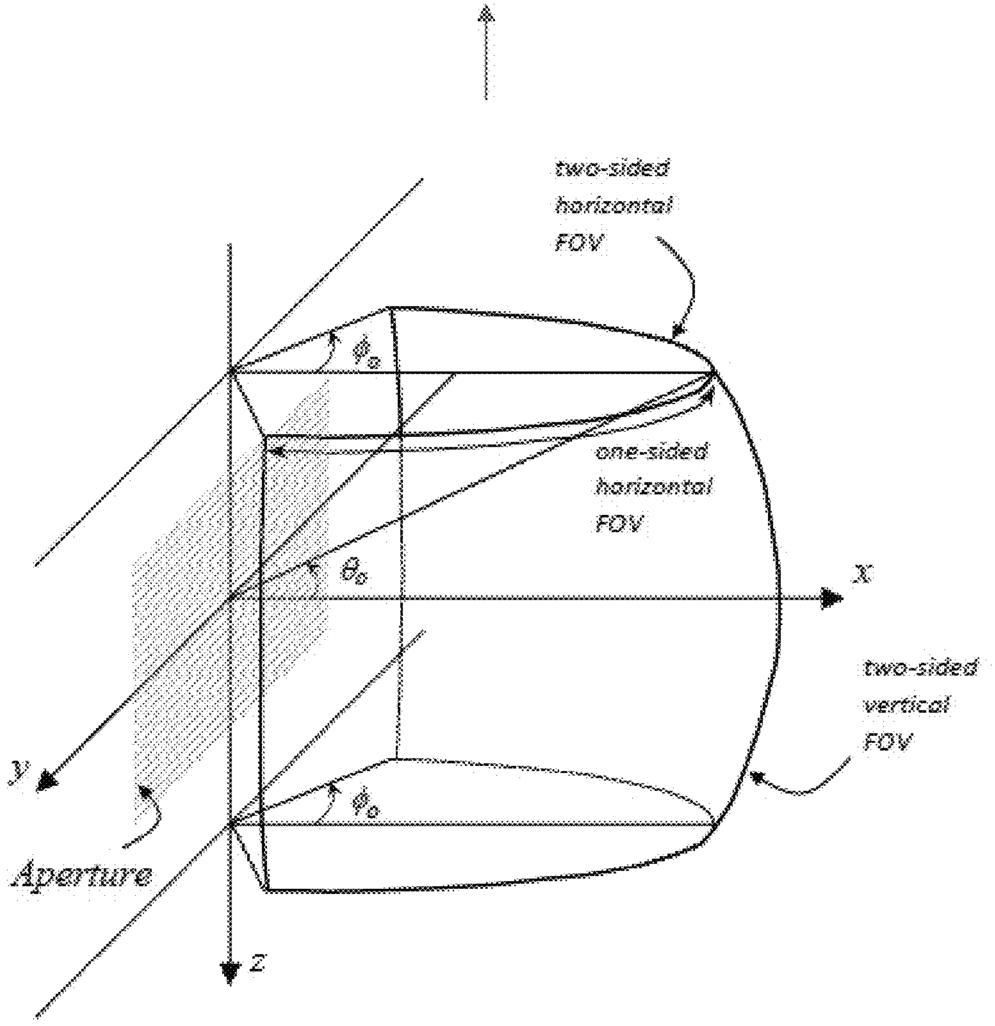
FIG. 3 is a diagram of a three-dimensional coordinate systems convention for antenna array geometry.
Figure 4:
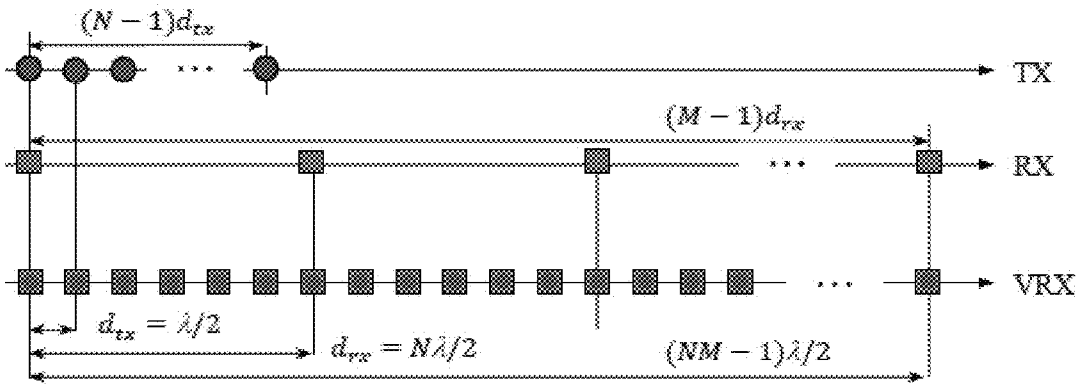
FIG. 4 is a diagram illustrating physical positions of N transmitters (TX), M receivers (RX), and a typical construction of NM virtual receivers (VRX) for a linear array.

In FIG. 3 is a usable field of view (FOV) maximum angular extent with no grating lobe effects. In a general sense, some radar specifications might use only a portion of the available FOV for which actual FOV is selected to be smaller than usable FOV. However, without any loss of generality, herein all exemplary radar systems have FOVs that are equal to usable FOV to avoid any misunderstanding.

FOV of interest in the azimuthal direction (azimuth, horizontal axis) is a full 180 degrees, or smaller as necessary where FOV is defined as largest angular span with no grating lobes. For a FOV of 180 degrees, the largest possible inter-element spacing for VRX antennas is $\lambda/2$. For two-dimensional (2D) gridded rectangular arrays, horizontal and vertical spacings independently determine FOV along azimuth and elevation, respectively. If the selected value of spacings in any axis is larger than $\lambda/2$, the FOV on that axis is smaller than 180 degrees. In FIG. 3, the FOV is measured with reference to broadside direction. The FOV can be defined as a one-sided or two-sided angular extent from broadside in azimuth and elevation. A one-sided FOV designated by simply FOV if side convention is not mentioned.

Figure 5A:
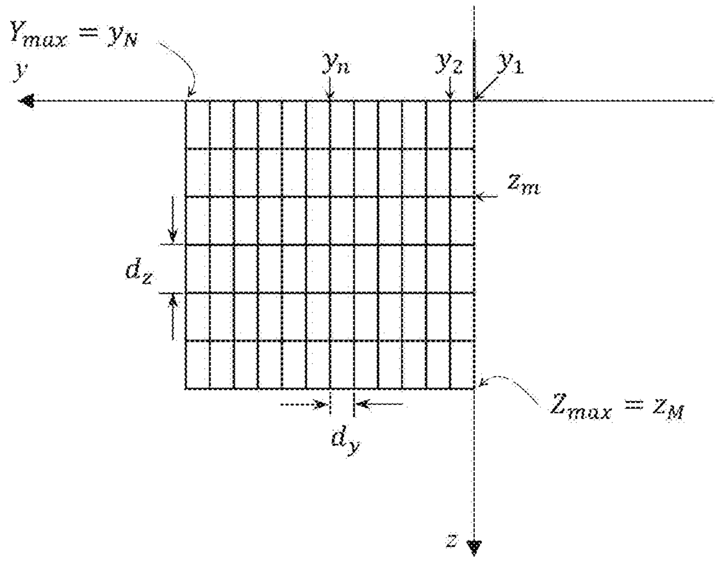
FIGS. 5A and 5B are diagrams of exemplary rectangular full-grid positions and virtual apertures formed by sparse array with fewer elements in an embodiment of the present invention.

In FIG. 5A, a rectangular virtual array with elements located at points is shown by the following exemplary mathematical model. Denoting $(y_r, z_r)$ are the coordinates of virtual elements, $y_n$ and $z_m$ are available locations, and N and M are the number of grid points along the horizontal and vertical axes, respectively.

$$y_n = n\ d_y \text{ for } n = 0, 1, 2 \ldots (N-1)$$

$$z_m = m\ d_z \text{ for } m = 0, 1, 2 \ldots (M-1)$$

A full-grid rectangular virtual array is shown in FIG. 4. A sparse array uses full-grid locations as a pool of possibilities. Denoting $$N_{vrx}^f$$

for total number of virtual receivers for full-gridded rectangular array $$N_{vrx}^f = NM.$$

Denoting $$N_{vrx}^s$$

for total number of virtual receivers for sparse rectangular array with R virtual elements located on its reference full-grid locations $$N_{vrx}^s = R < NM = N_{vrx}^f$$

Figure 5B:
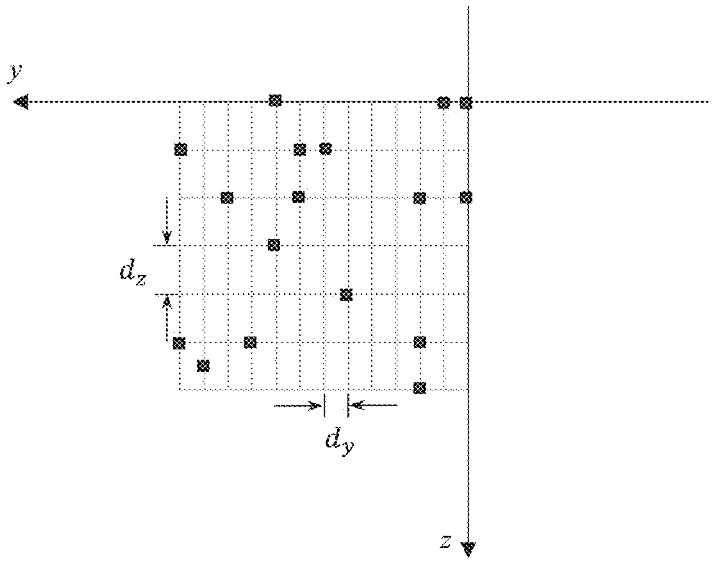

In FIG. 5B, an exemplary sparse array is illustrated using the full-grid positions but with few array elements. Sparsity ratio and sparsity percentage are exemplary measures and are defined by the following exemplary mathematical models. Denoting $S_r$ and $S_p$ are the sparsity ratio and sparsity percentages, respectively.

$$S_\gamma = N_{vrx}^s / N_{vrx}^s = R/(NM),$$

and $S_p=100S_r\%$

Sparsity percentage for prior art (full-grid) antenna arrays is 100%. As sparsity ratio decreases, the number of total virtual elements decreases in comparison to its reference full-grid array.

An antenna pattern for a sparse array for detecting targets far from a radar system is calculated by the following exemplary mathematical model. Denoting $P(\phi,\theta)$ for antenna pattern for angles $(\phi,\theta)$ inside the FOV, R for total number of virtual receivers, $(y_r/\lambda, z_r/\lambda)$ for virtual array element coordinates, $d_y/\lambda$ and $d_z/\lambda$ for inter-element spacing in terms of wavelength for horizontal and vertical axes (electrical length), respectively $u(\phi,\theta)=\sin\phi\cos\theta$, and $v(\theta)=\sin\theta$ $$P(\phi, \theta) = \sum_{r=1}^{R} e^{j2\pi\left(\frac{y_r}{\lambda}u(\phi,\theta)+\frac{z_r}{\lambda}v(\theta)\right)}$$

Antenna patterns for exemplary array types are given in FIGS. 6A, 6B, and 6C FIG. 6 where antenna patterns are for linear virtual receivers. The number of virtual receivers, inter-element spacings, and aperture lengths are: 121, $\lambda/2$, $60\lambda$ and 121, $\lambda$, $120\lambda$ and 61, $\lambda$, $60\lambda$, for FIGS. 6A, 6B, and 6C, respectively.

In FIGS. 6A, 6B, 6C, and FIG. 7 spatial coordinates are denoted by $u(\phi,\theta)$ and $v(\theta)$ is also called 'sine' domain. The mathematical model given below is a one-to-one transformation from spatial coordinates to spherical coordinates inside semispherical angular domain.

$\theta=\sin^{-1}(v)$ and $\phi=\sin^{-1}(u/\cos\theta)$, where $-90°<\theta<90°$, $-180°<\phi<180"$, and $\sin^2(\theta)+\sin^2(\phi)\cos^2(\theta)<1$.

Figure 6A:
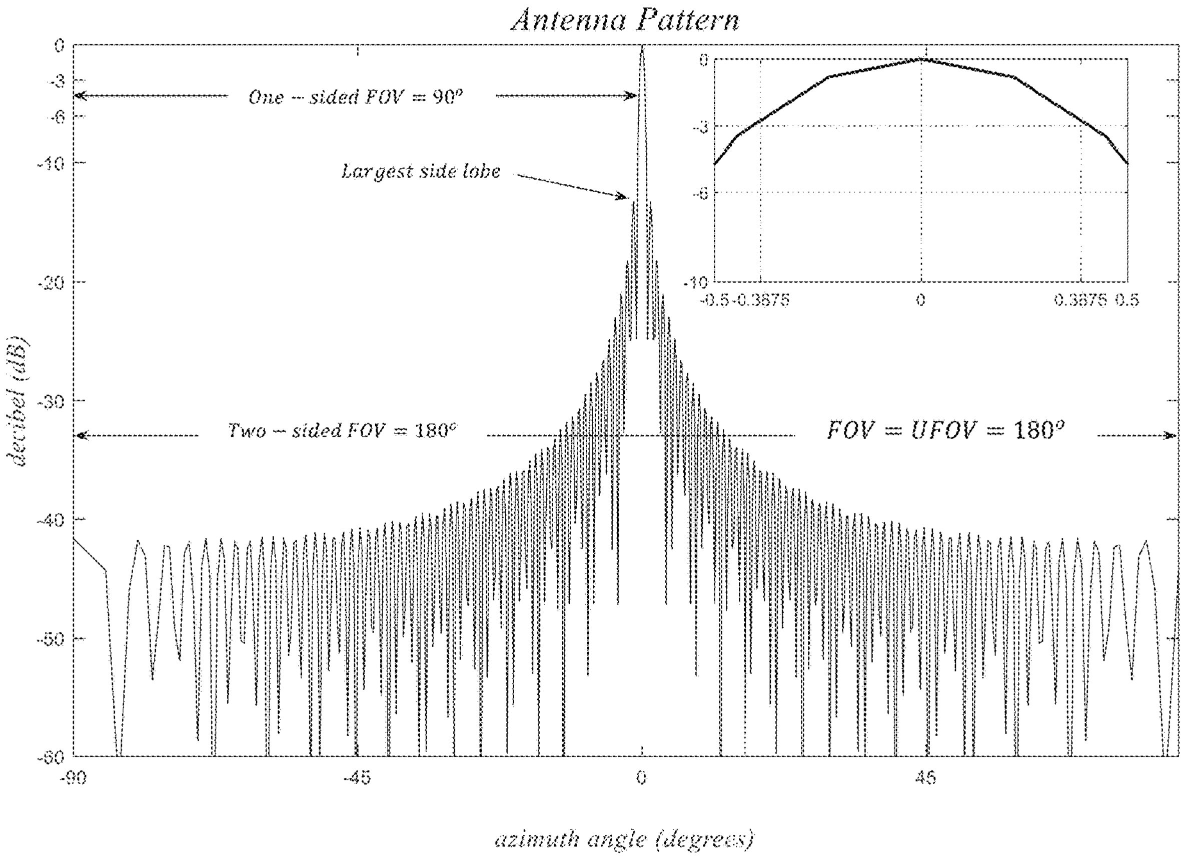
FIGS. 6A, 6B, and 6C are diagrams of antenna patterns illustrating how one-dimensional antenna patterns change for linear virtual receivers when inter-element spacings decrease and number of array elements decrease improving FOV and BW in an embodiment of the present invention.
Figure 6B:
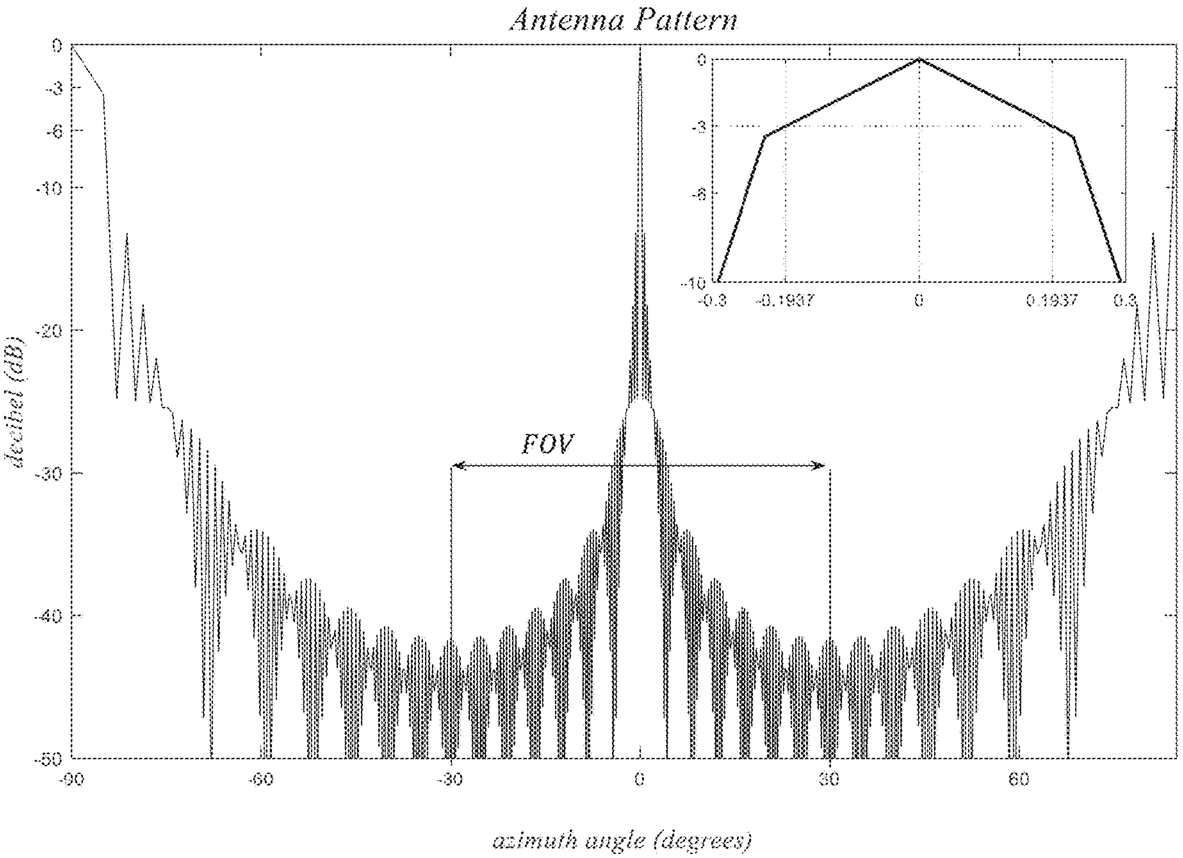
Figure 6C:
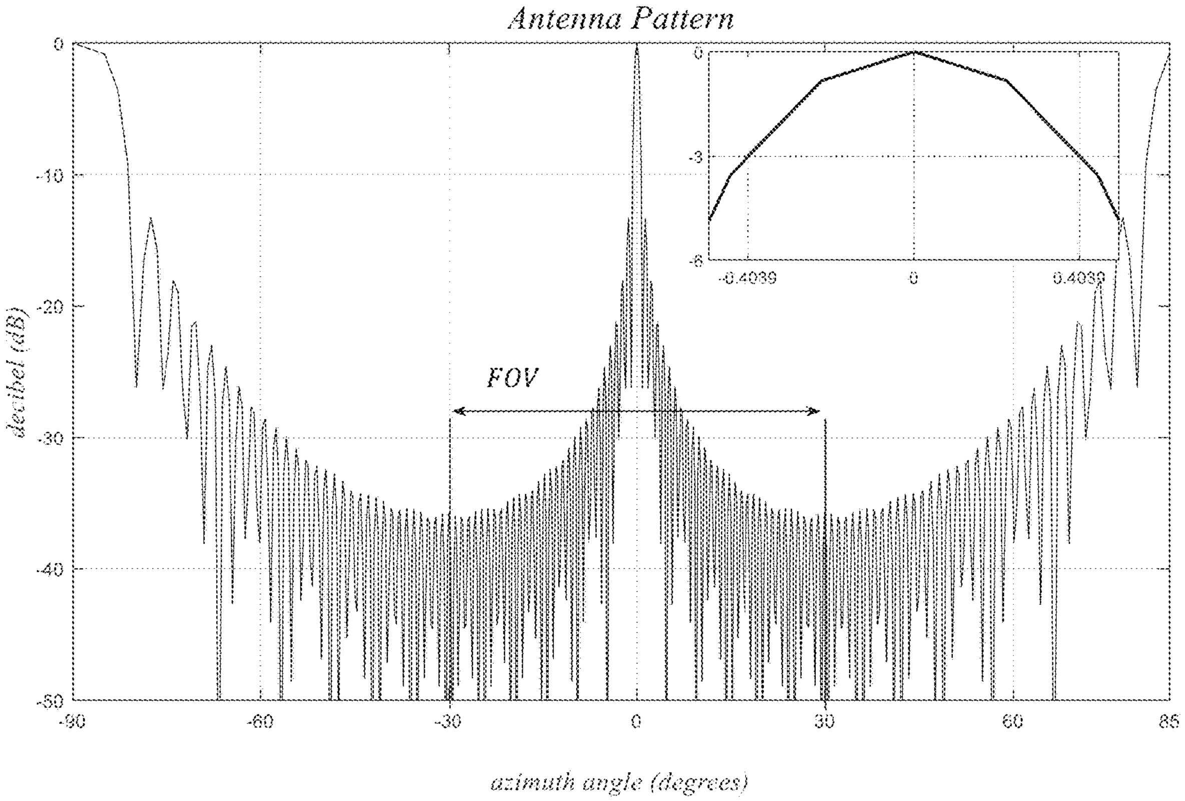
Figure 7A:
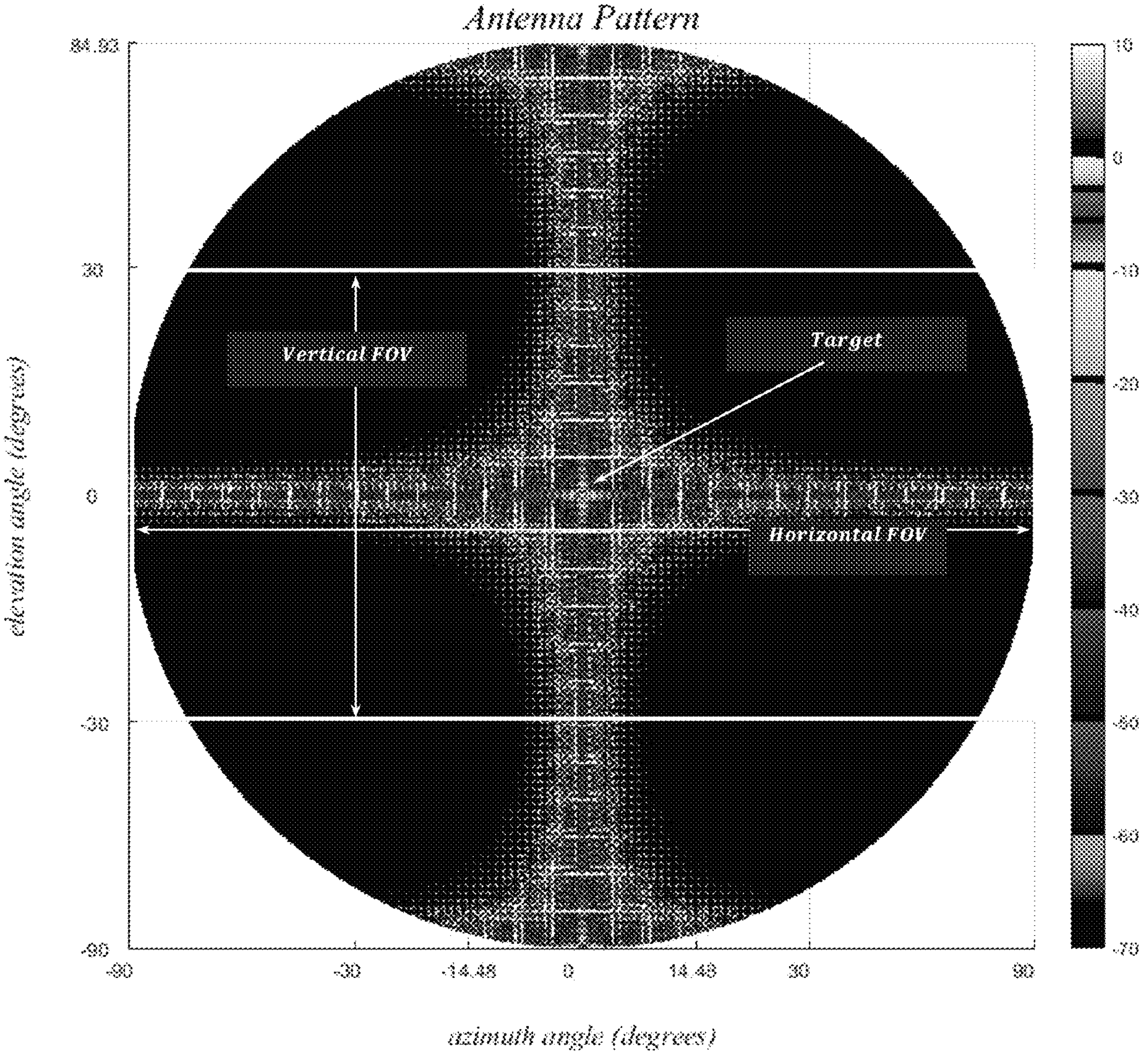
FIGS. 7A, 7B, and 7C are diagrams of antenna patterns illustrating how one-dimensional antenna patterns change for linear virtual receivers when inter-element spacings decrease and number of array elements decrease both improving FOV and BW in an embodiment of the present invention.
Figure 7B:
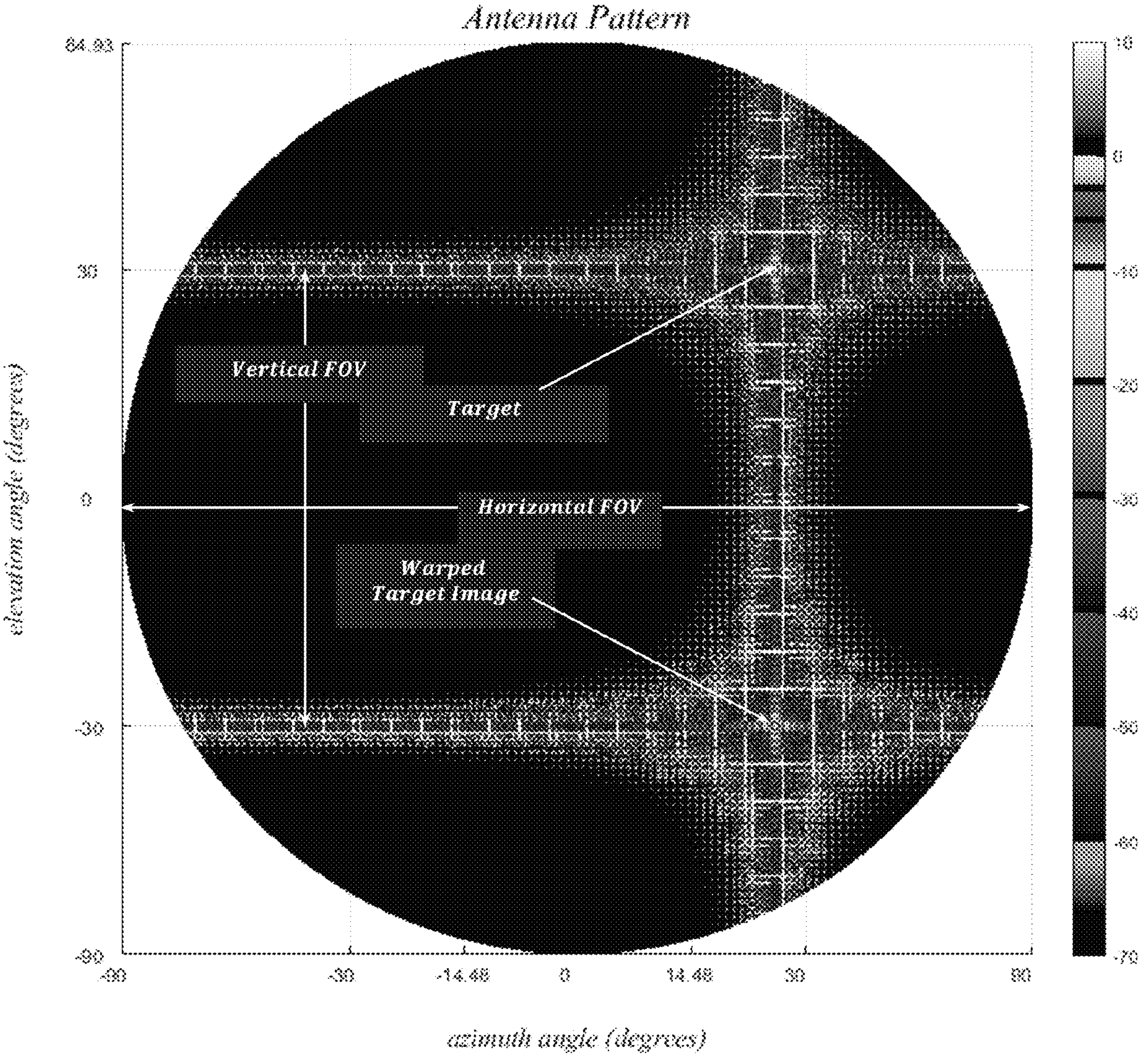
Figure 7C:
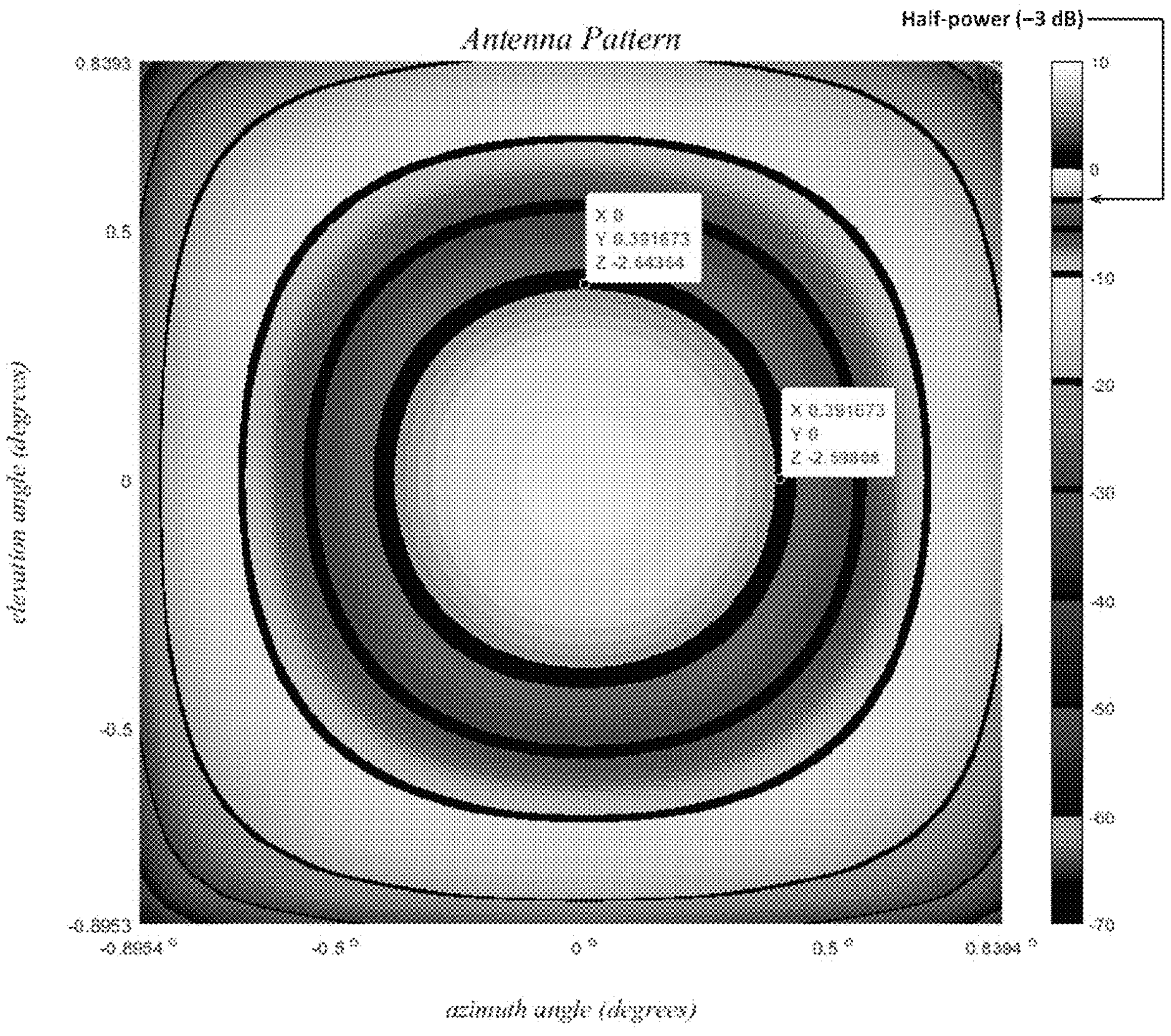

FIGS. 6A, 6B, and 6C are figures where horizontal axes are sine domain (u, v) with horizontal tick values that are converted to $(\phi, \theta)$ for illustration purpose. Similarly, FIGS. 7A, 7B, and 7C are figures where both horizontal and vertical axes are sine domain (u, v) with tick values that are converted to $(\phi, \theta)$ for illustration purpose.

In prior art multiple-input-multiple-output (MIMO) radars, the TX and RX antennas were located such that the VRX locations were as far as possible unique, that is, no repeated locations and the prior art sought to produce a VRX array that had no grating lobes within total angular span and field-of-view (FOV) of interest where no grating lobe region is angular region where the expected received phase delays do not vary larger than 180 degrees for a single object in FOV and in range to avoid warping of received phases. Due to phase warping, antenna pattern outside of the FOV generates a flipped-pattern of the inside providing no additional information. This usable region is called the usable field of view (UFOV). The UFOV is 90 degrees both sides of broadside with a UFOV of 180 degrees when inter-element spacing is of λ/2. An exemplary antenna pattern for 121 virtual receivers (VRX) with array element spacing λ/2 is illustrated in FIG. 6A. The UFOV reduces down to approximately to 60 degrees when spacing increases to λ. Two exemplary antenna patterns for 121 and 61 virtual receivers (VRX) both with array element spacing λ are illustrated in FIG. 6B and FIG. 6C, respectively.

Grating lobe angle is calculated in radians by the following exemplary mathematical model. Denoting $\phi_{GL}$ for observed grating lobes for a target at broadside, $d_\lambda$ for inter-element spacing in terms of wavelength $$\phi_{GL} = \sin^{-1}\left(\frac{n}{d_\lambda}\right),\quad \text{for } n:\ -1 < \frac{n}{2d_\lambda} \le 1, \text{ and for } n = \pm 1, \pm 2 \ \ldots$$

where target is located at the angular location for n=0. All other values create flipped or warped copies of the target.

In FIGS. 6A, 6B, and 6C, antenna patterns show the number of virtual receivers, inter-element spacings, aperture lengths, FOV, and BW to be (A) 121, λ/2, 60λ, 180°, 0.3875, (B) 121, λ, 120λ, 90°, 0.1937, and (C) 61, λ, 60λ, 90°, 0.4039, respectively. Usable FOV, $\phi_{FOV}$, is the angular region where no such copies of targets are present even if target is at edge of FOV.

$$\phi_{FOV,twosided} = 2\sin^{-1}\left(\frac{n}{2d_\lambda}\right)\Big|_{min},$$

$$\text{for } n:\ 0 < \frac{n}{2d_\lambda} \le 1, \text{ and for } n = 1, 2 \ \ldots$$

$$\phi_{FOV,onesided} = \sin^{-1}\left(\frac{n}{2d_\lambda}\right)\Big|_{min},$$

$$\text{for } n:\ 0 < \frac{n}{2d_\lambda} \le 1, \text{ and for } n = 1, 2 \ \ldots$$

Required FOV and inter-element spacing are related and once one is set the other is constrained. In FIG. 6A, exemplary one-sided FOV (simply FOV) for 121 virtual elements is 90 degrees for spacing λ/2. In FIGS. 6B and 6C, the FOV is 30 degrees for spacing λ both for 121 and 61 virtual elements.

Exemplary one-dimensional antenna patterns for two linear antenna arrays given in FIGS. 6A and 6C are for 121 and 61 virtual elements and for spacings λ/2, and λ, respectively.

Angular resolution along an axis is related to the physical extent of array elements (aperture) along that axis, a smaller angular resolution requires a larger extent of array elements where the extent is measured in terms of wavelength. Smaller angular resolution is better resolving ability of noticing/separating closely (angular) located targets. For a given spacing value, a larger extent requires a larger number of elements to fill full-grids (FIGS. 6A and 6C). The antenna pattern and angular beam width for linear virtual receivers can be compared with a similar 2D array (compare FIG. 6A and FIG. 6C with FIGS. 7A, 7B, and 7C FIG. 7).

In FIGS. 7A, 7B, and 7C, antenna patterns are for exemplary rectangular virtual receivers. The number of virtual receivers are 121 by 61 with a total of 7,381, and spacings are λ/2, λ for horizontal and vertical axes, respectively, (FIG. 7A) target is at (ϕ,ϵ)=(0°,0°), (FIG. 7B) target is at (ϕ,ϵ)=(30°,30°), and (FIG. 7C) close-up image of the target beamwidth (BW) region. Horizontal and vertical antenna pattern cross-sections of FIG. 7A are equal to 1D patterns in FIGS. 6A and 6C. The FOV values for rectangular exemplary 2D array are 90 and 30 degrees for spacings λ/2, and λ, respectively. In FIG. 7A and FIG. 7B, target is at (ϕ,ϵ)=(0°,0°), and at (ϕ,ϵ=(30°,30°), respectively.

Angular resolution is related to the antenna beam width of the array. Antenna beam width is better (smaller) for an array with a larger extent. Half power beam width, $BW_{hp}$, and first null beam width, $BW_{fn}$, are calculated in radians approximately by the following exemplary mathematical model. Denoting N for number of linear array elements, $d_\lambda$ and $L_\lambda$ for spacing and extent (aperture length) in terms of wavelength respectively $$BW_{fn} = a\sin\left(\frac{1}{Nd_\lambda}\right) = a\sin\left(\frac{1}{L_\lambda}\right)$$

$$BW_{hp} = 0.886\left(\frac{1}{Nd_\lambda}\right) = 0.886\left(\frac{1}{L_\lambda}\right)$$

In FIGS. 6A, 6B, and 6C, antenna pattern has its largest value at target location. All other peak values are side lobes. Maximum side lobe level (SLL) is largest of all side lobes. SLL is constant for prior art 1D and 2D arrays using full-grid array locations. Change of inter-element spacing, number of elements, and element extent do not change SLL. SLL is always constant for full-grid arrays and cannot be changed without using tapering.

In prior art antenna arrays, larger FOV and smaller angular resolutions require larger element extents (apertures) and large number array elements. Number of elements, FOV and angular resolution are constrained, meaning that improvement in any one of them needs to be compensated by degradation of others. FOV will improve by degrading angular resolution (BW) when all other parameters are kept the same, and vice versa. To improve both FOV and BW simultaneously, the number of elements must be increased, which would increase computation complexity.

In engineering applications and implementations, there are a finite number of available transmitters and receivers, those elements have physical sizes which could limit spacing among them. Further, mutual coupling between transmitters and receivers could also require those groups to be separated physically. Under those constraints, for a full-grid array with spacing λ/2, further improvement of FOV, BW and SLL is not possible without increasing number and reducing the size of elements.

Therefore, there is need for an efficient way to design and construct TX/RX arrays. This invention can also be applied to and improves fundamental capacity of prior art antenna arrays, antenna arrays for communications systems, ground penetrating radars, and also transducer arrays for ultrasound imaging devices.

In prior art MIMO radars, only two of the values; FOV, angular resolution, and total number of array elements can be selected independently, the third is constrained by the first two values, often limiting the capability of radar. Exemplary embodiments with sparse arrays allow efficient use of array elements with larger apertures with wider FOV utilizing a reduced number of elements.

The sparse array technique provides array solutions for a desired reduced number of elements, FOV, and BW. Those three values are treated independently where FOV and BW determine element spacing(s) and antenna extent(s), respectively. An engineering objective is to obtain the widest FOV, the narrowest BW utilizing the minimum number of elements. The FOV values are considered one-dimensional for a linear array, and two-dimensional for rectangular arrays with two perpendicular axes (aperture). An exemplary antenna array geometry is depicted in FIG. 3.

Figure 8:
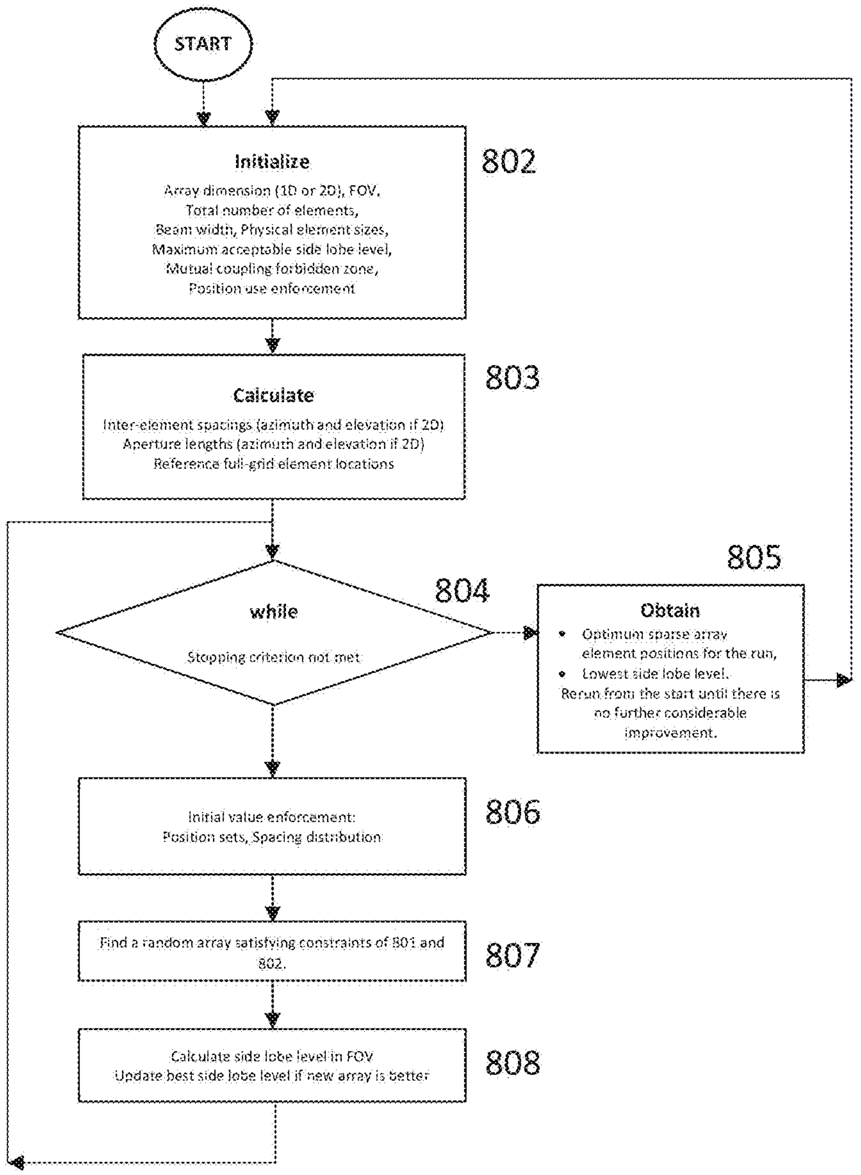
FIG. 8 is a block diagram illustrating the steps to a method for sparse antenna array design in an embodiment of the present invention.

FIG. 8 illustrates an exemplary method for arranging a sparse array. In step 802, an initialization step defines desired array properties: dimension, available number of elements, beam width, and maximum side lobe level. Further constraints on the array can also be added: physical sizes for TX and RX elements, forbidden mutual coupling zone between TX and RX elements, and priori list of element locations enforced to be utilized, if necessary. In step 803, inter-element spacings and aperture lengths for the array are calculated using desired FOV, and BW, respectively. The FOV and BW are used to calculate reference full-grid element locations.

In step 806, initial element positions are filled with the enforced locations if required. Further, uniform inter-element spacing can be created to be used in further steps for faster convergence to an optimum array. For this, non-repeating-spaced element positions are initially determined. Their ordering is randomly shuffled at each run to provide a good-initial array candidate.

In step 807, random element locations are found which satisfy both step 802 and step 803. For faster convergence, initial values offered in step 806 can be used here before random perturbation of locations. Perturbations are shifting of elements by multiples of minimum-inter-element spacing.

In step 808, maximum side lobe level (SLL) in FOV is calculated for candidate array which is proposed in step 807. Best value of SLL is updated if new SLL is lower (better).

Steps 806 through step 808 are repeated for each run until a stopping criterion is met in step 804. The Left loop is called an inner loop. An Exemplary stopping criterion is reaching a maximum iteration number. Each run finalizes iterations and output optimum sparse array solutions for that run to step 805. In step 805, optimum positions and SLL values for each run are monitored. Step 805 continues back to step 802 for another run if the last two SLL values are different enough. After a sufficient number of runs (e.g., a minimum of 5), the last two optimum SLL values are monitored. If their difference is lower than significance (an exemplary value of 0.5 decibels), the algorithm/method's outer (right) iteration loop is stopped. This finalizes all iterations. Sparse array locations corresponding to the lowest SLL yields an optimum sparse array.

In general, the sparse array algorithm/method (see FIG. 8) finds an optimum array solution for a sparse array with FOV, BW, number of elements, and SLL. The algorithm/method can be initialized by any three of those to optimize for the remaining fourth. Other criteria: mutual coupling and physical element size limitations can be taken into consideration during optimization iterations.

The exemplary algorithm of FIG. 8 provides improved arrays with the following properties: (1) independency between BW and total number of elements, (2) independency between FOV and total number of elements, (3) allows physically large elements to be used to form smaller inter-element spacings, (4) allows transmitter and receiver groups to be separated to avoid using mutual coupling zone, and (5) allows enforcement of the use of a priori list of element locations.

Figure 9A:
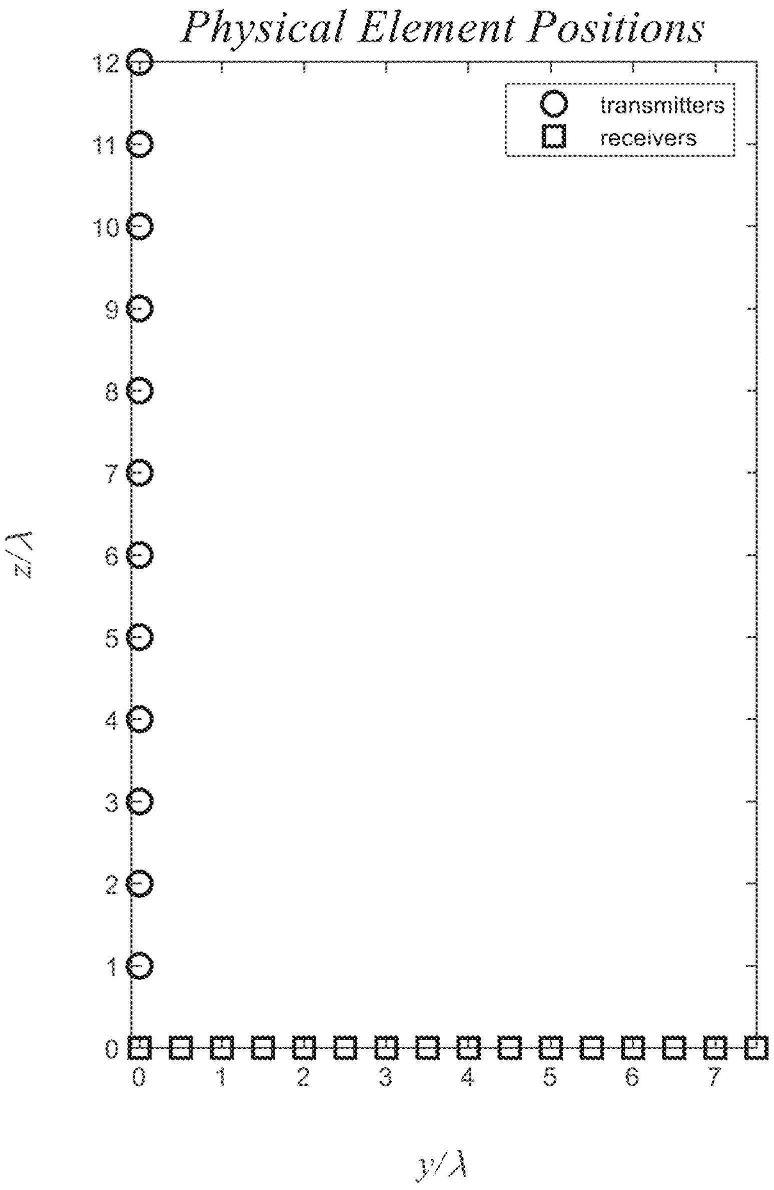
FIG. 9A is a diagram illustrating physical antenna element positions.
Figure 9B:
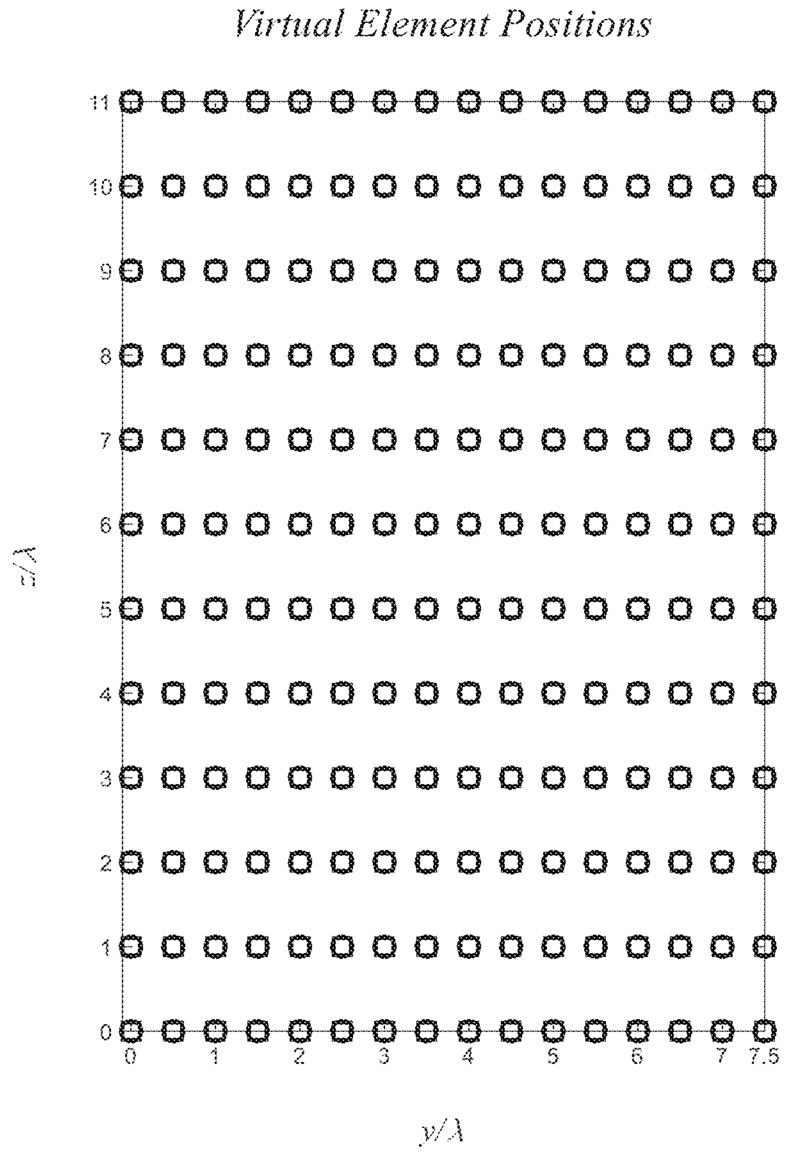
FIG. 9B is a diagram illustrating exemplary virtual antenna element positions.
Figure 10A:
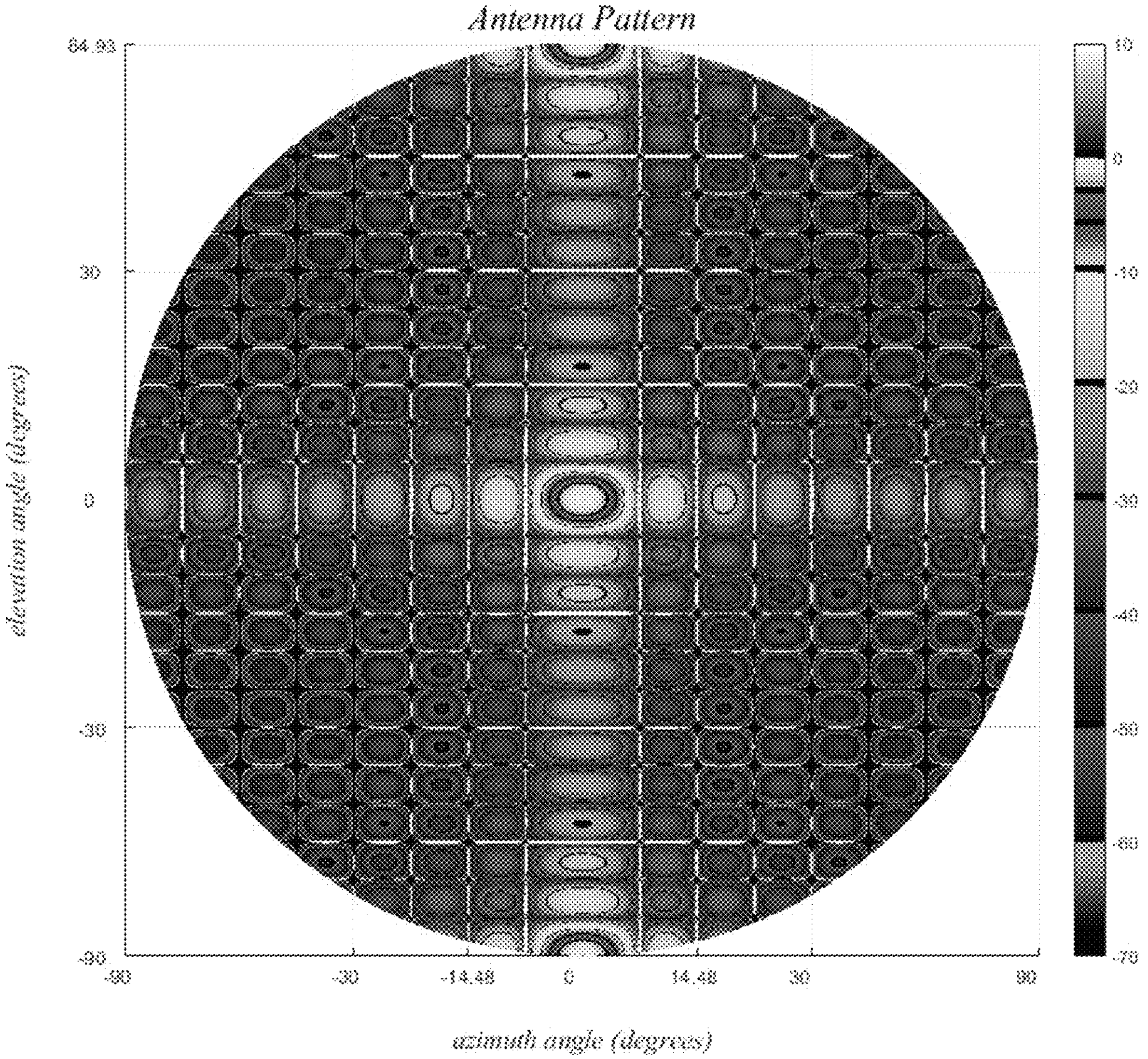
FIGS. 10A, 10B, 10C, 10D are diagrams of exemplary antenna patterns illustrating how beam width (BW), grating lobes, and FOV for horizontal and vertical are observed for different target angles.
Figure 10B:
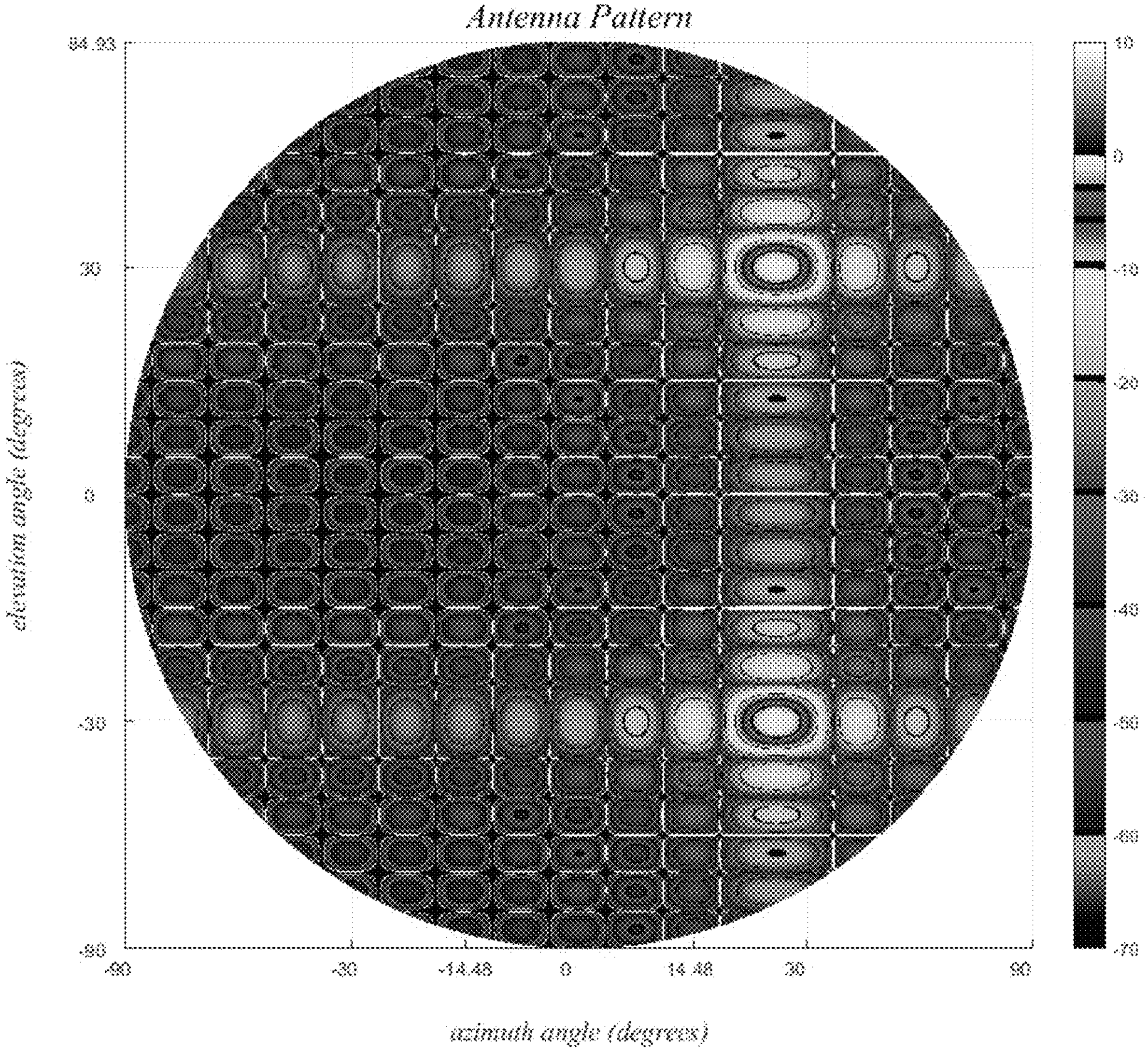
Figure 10C:
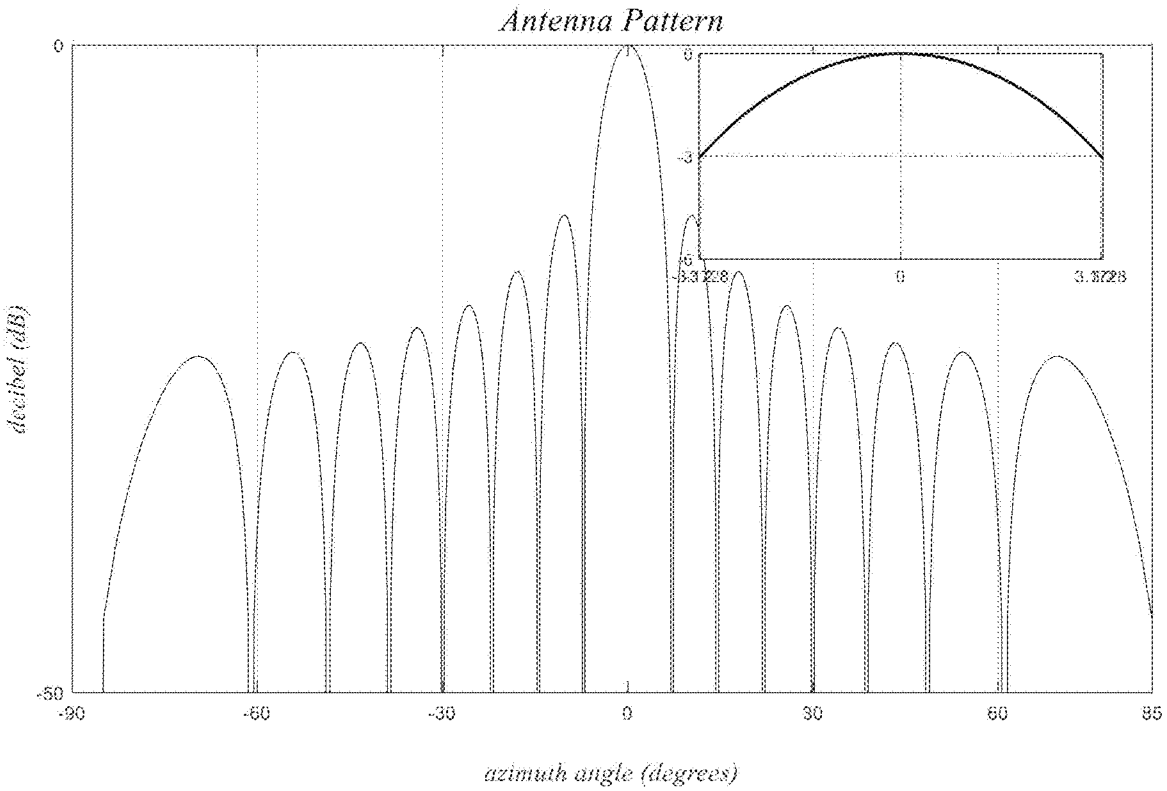
Figure 10D:
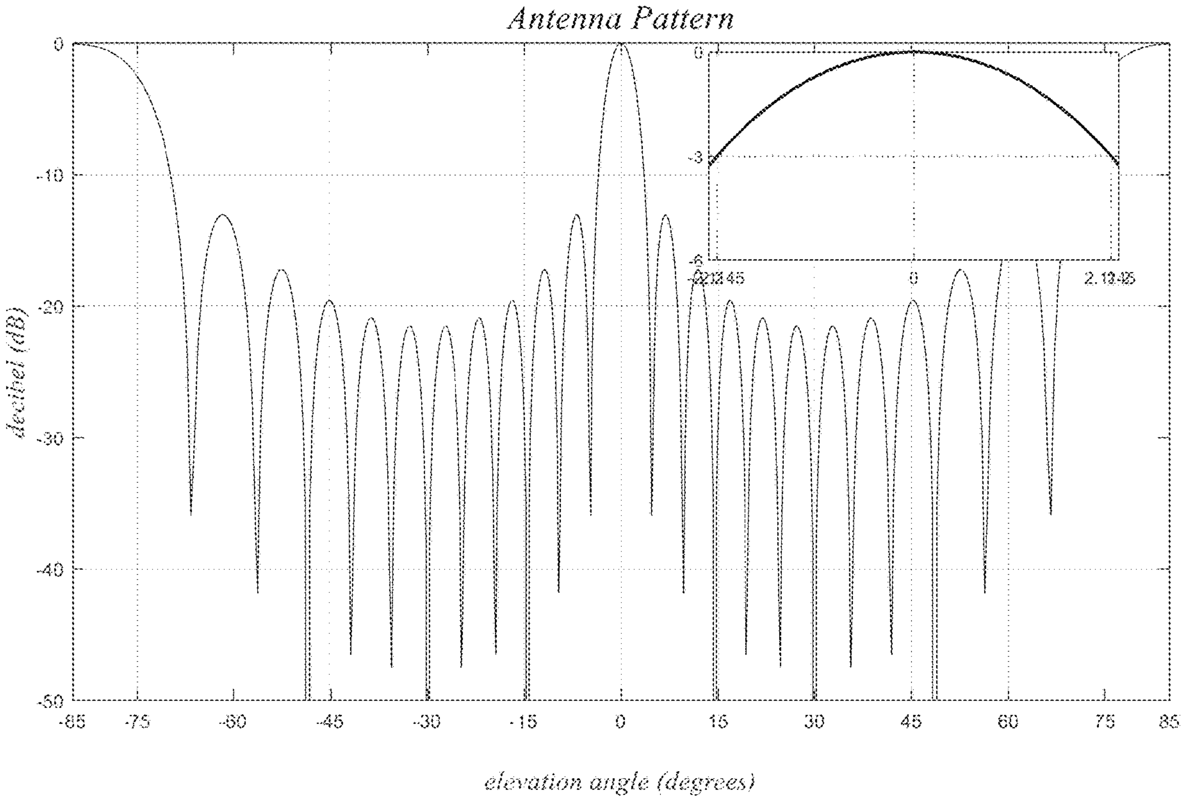

In FIGS. 9A and 9B, an exemplary prior art rectangular 192 full-grid virtual array elements are created using 16 transmitter and 12 receivers. Inter-element spacings are λ/2 and λ for horizontal and vertical, respectively. Same virtual array locations can be formed using different transmitter and receiver formations. Inter-element spacings are λ/2 and λ for horizontal and elevation, respectively.

In FIGS. 10A, 10B, 10C, and 10D, antenna patterns, for example, prior art array in: (FIG. 10A) 3D, target angle=(0°, 0°); (FIG. 10B) 3D, target angle=(30°, 30°); (FIG. 10C) azimuth; and (FIG. 10D) elevation for target angle=(0°, 0°).

In FIGS. 10A, 10B, 10C, and 10D, antenna patterns, compared to the prior art array of FIGS. 9A and 9B, show one-sided FOV are 90° and 30°, and BW are approximately 3° and 2° for horizontal and elevation, respectively.

Figure 11A:
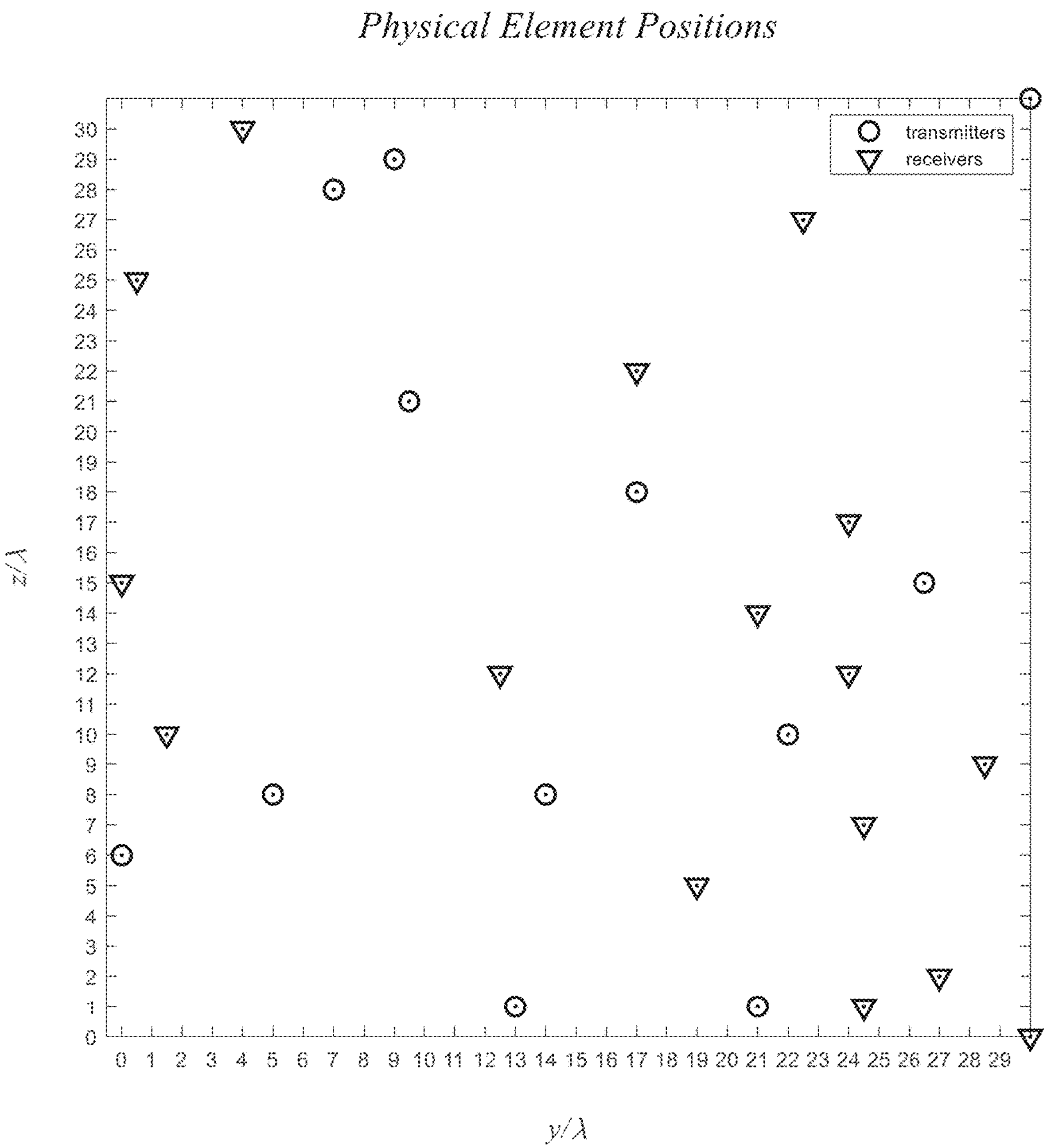
FIGS. 11A and 11B are diagrams of physical element positions and virtual element positions to illustrate improved physical TX/RX array positions resulting sparse virtual array with elements spread over a larger aperture in an embodiment of the present invention.
Figure 11B:
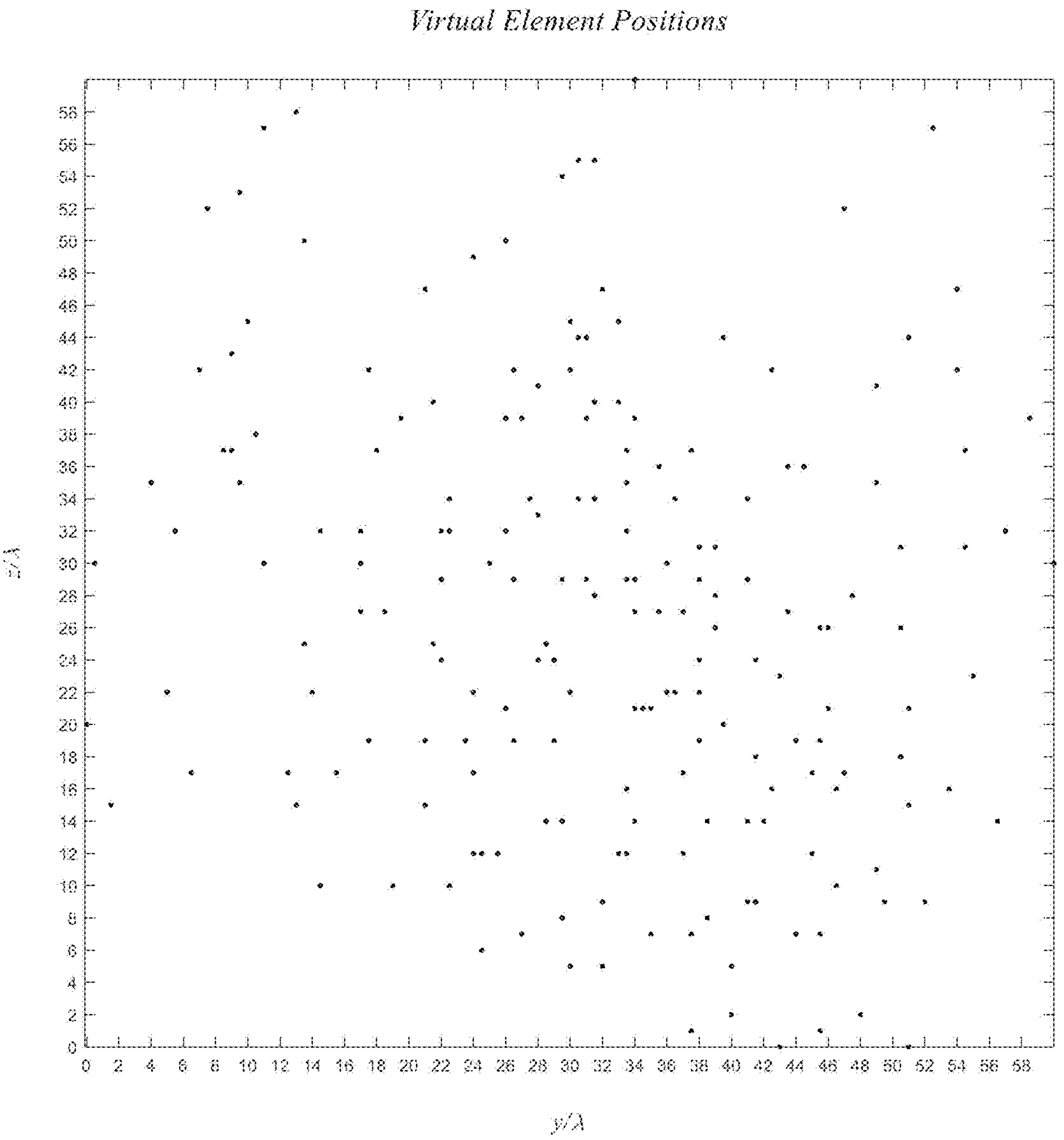

FIG. 11A illustrates exemplary improved physical TX/RX array positions, while FIG. 11B illustrates the resulting sparse array with 12×16=192 virtual elements, and with the same spacings as of FIGS. 9A and 9B.

Figure 12A:
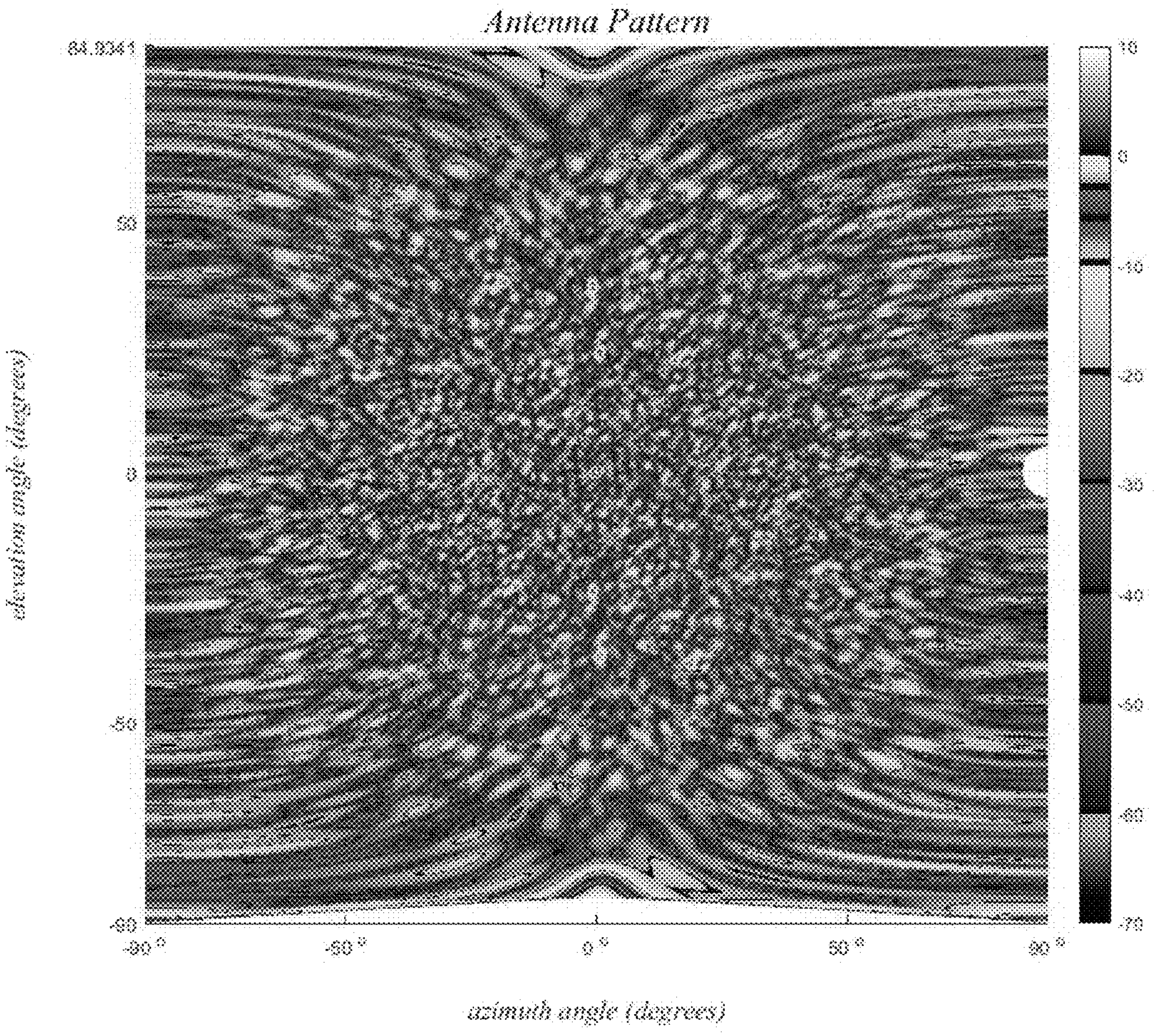
FIGS. 12A, 12B, 12C, 12D, and 12E are diagrams of antenna patterns illustrating resultant improved vertical FOV and BW with side lobes adjacent to target greatly reduced in an embodiment of the present invention.
Figure 12B:
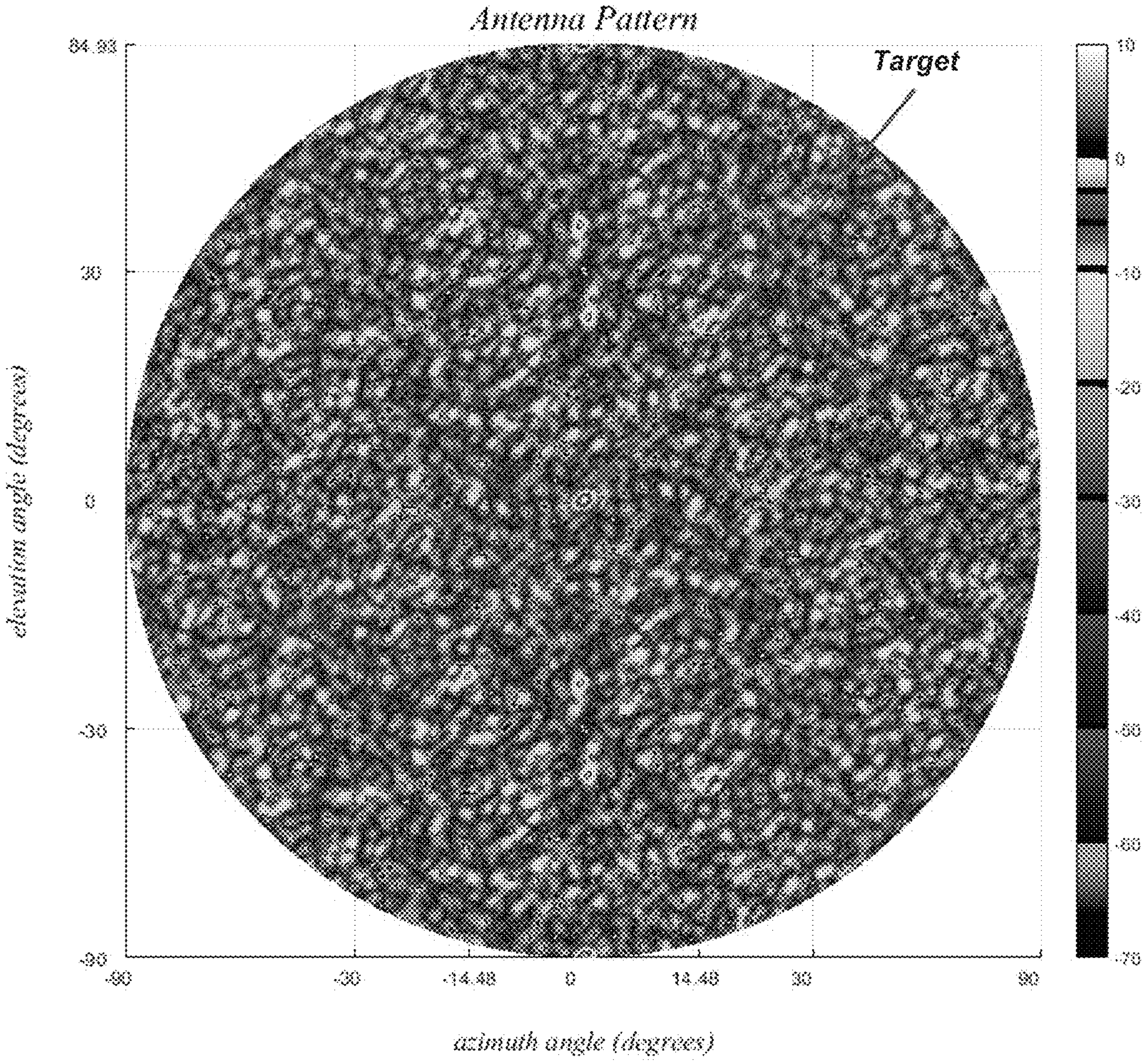
Figure 12C:
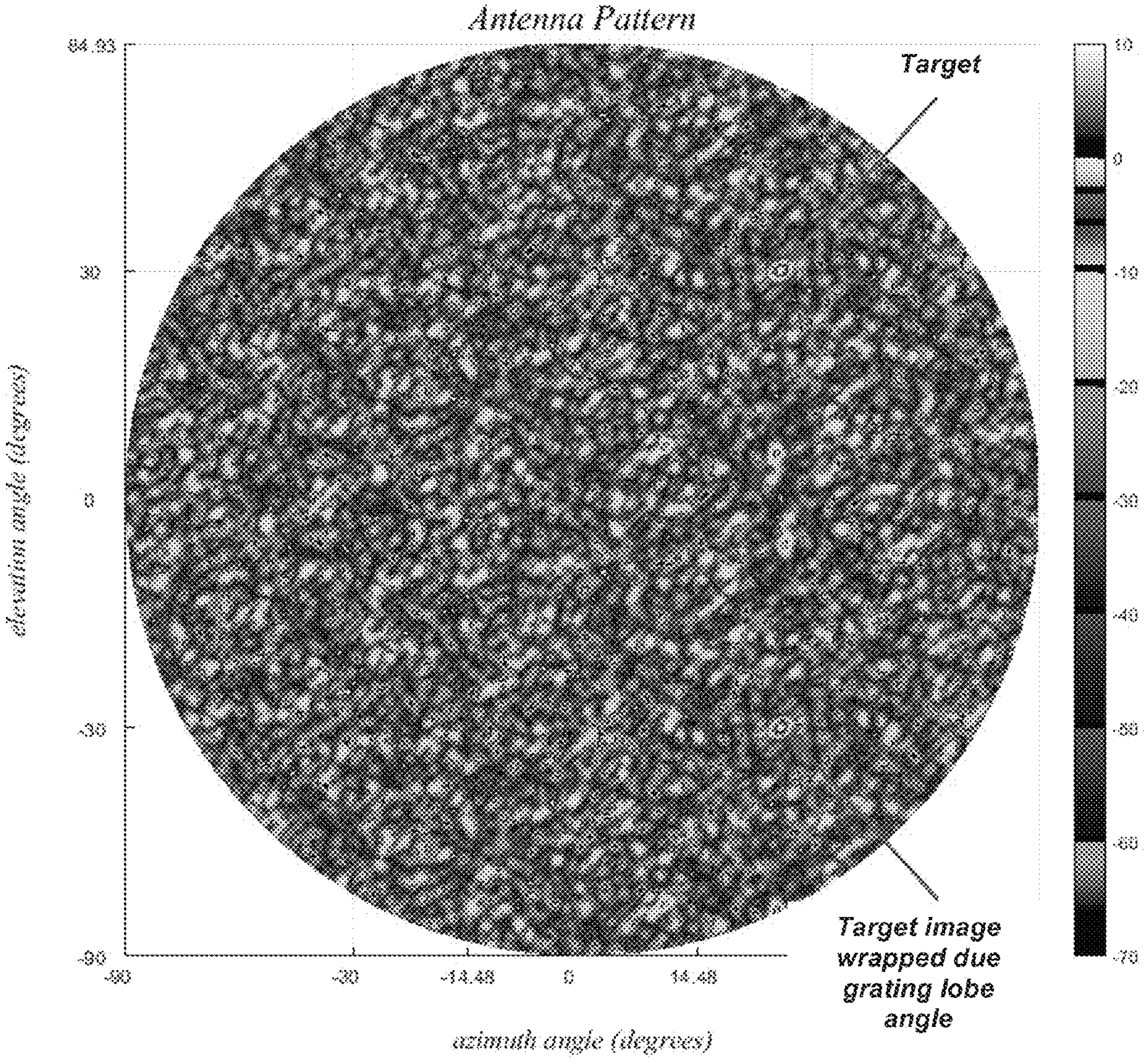
Figure 12D:
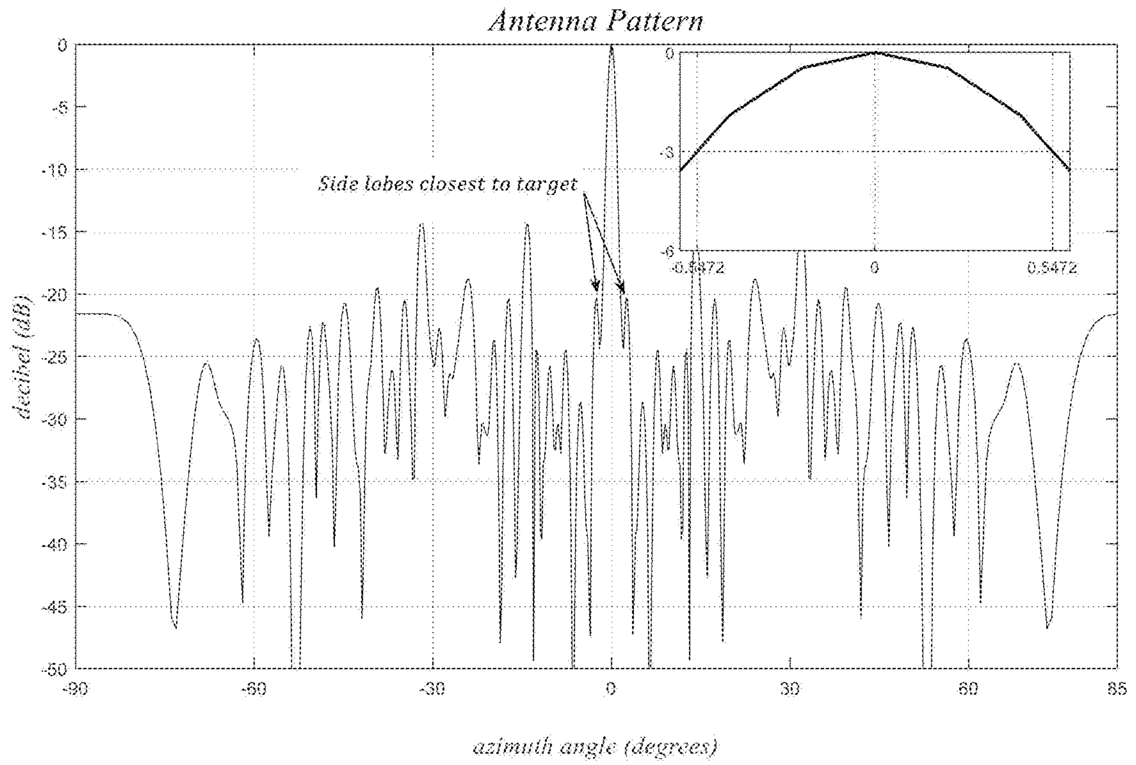
Figure 12E:
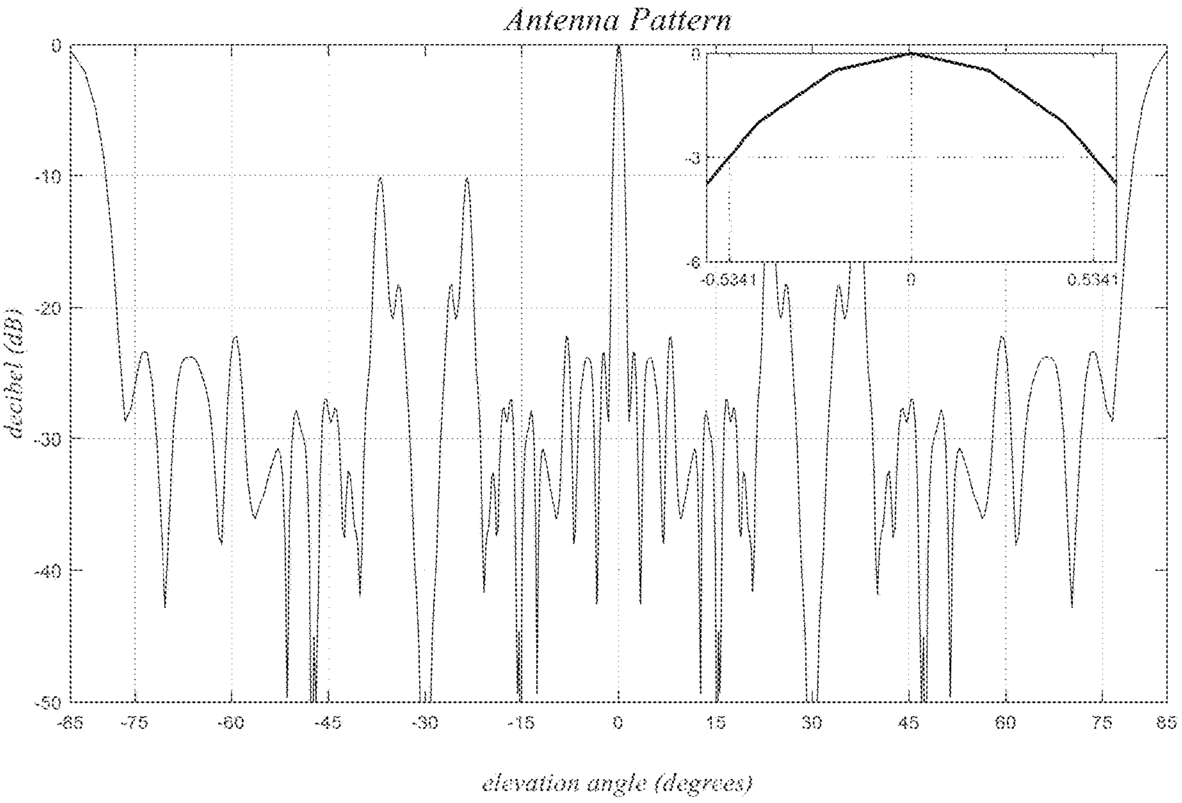

FIGS. 12A, 12B, 12C, 12D, and 12E illustrate exemplary antenna patterns for an improved optimum sparse array with the new sparse array design technique using 2.6% sparsity is given. FIGS. 12A and 12B illustrate a 2D plot, target angle=(0°,0°); FIG. 12C illustrates a 2D plot, target angle=(30°,30°); while FIGS. 12D and 12E illustrate 1D plots along azimuth and elevation with target angle=(0°,0°), respectively. For all figures, except FIG. 12A, axes are spatial variables, (u, v) with tick values converted to degrees for clarification. For FIG. 12A, both axes are (ϕ, θ) given in degrees. Using exemplary sparse array FOV for vertical is improved to be 90°. BW for horizontal and vertical are both decreased to be below 0.55°.

Figure 13A:
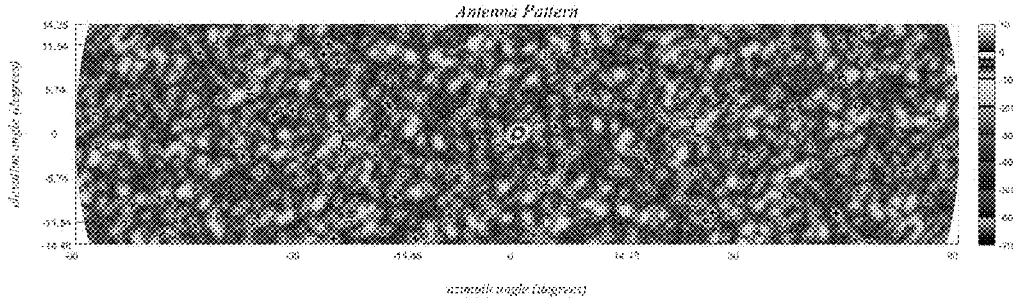
Figure 13A:
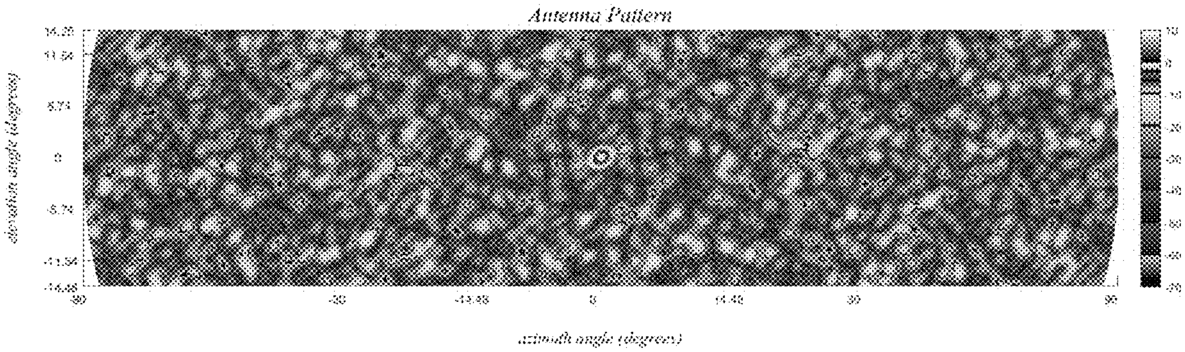
Figure 13C:
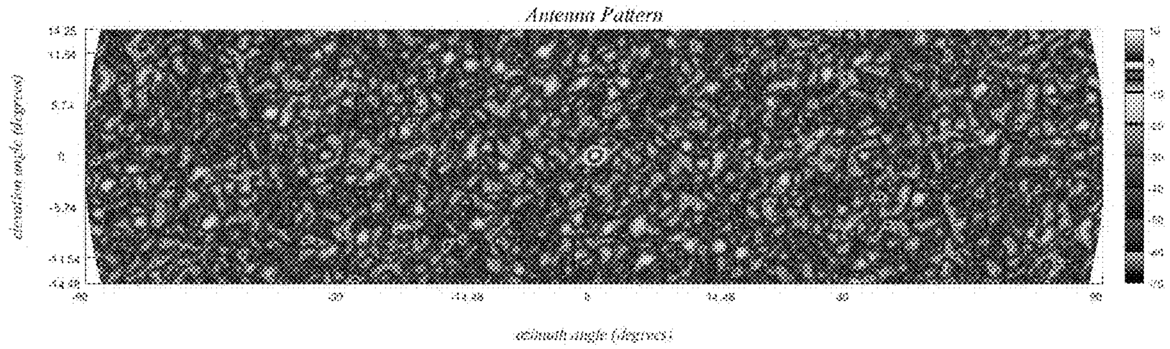
Figure 13C:
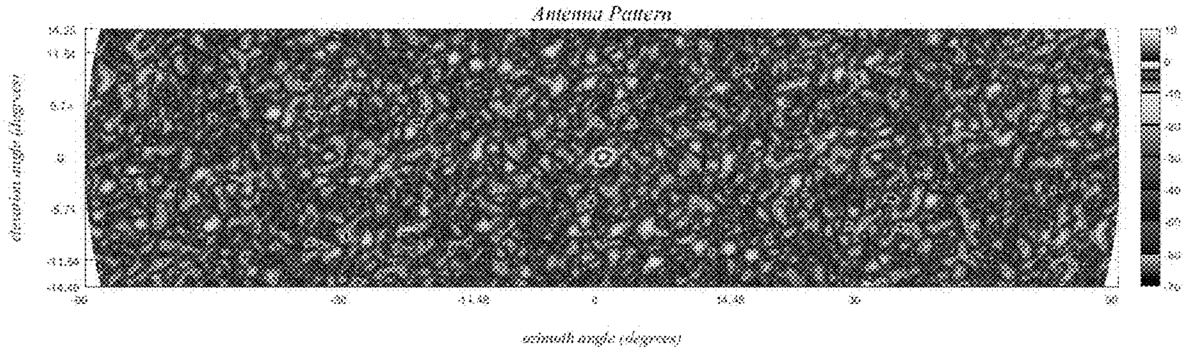

FIGS. 13A, 13B, 13C, and 13D illustrate exemplary antenna patterns with differential beamforming, which is used to further reduce SLL. Exemplary differential beamforming is done for a vertical FOV of 15° degrees. Antenna patterns for an improved optimum sparse array with the new sparse array design technique has 2.6% sparsity with target angle=(0°,0°) as illustrated in FIG. 12. FIGS. 13A and 13B illustrate the results of beamforming as illustrated in FIG. 12; FIGS. 13C and 13D illustrate the antenna pattern using differential beamforming for a FOV set to 90° and 15° for horizontal and vertical, respectively.

Figure 14A:
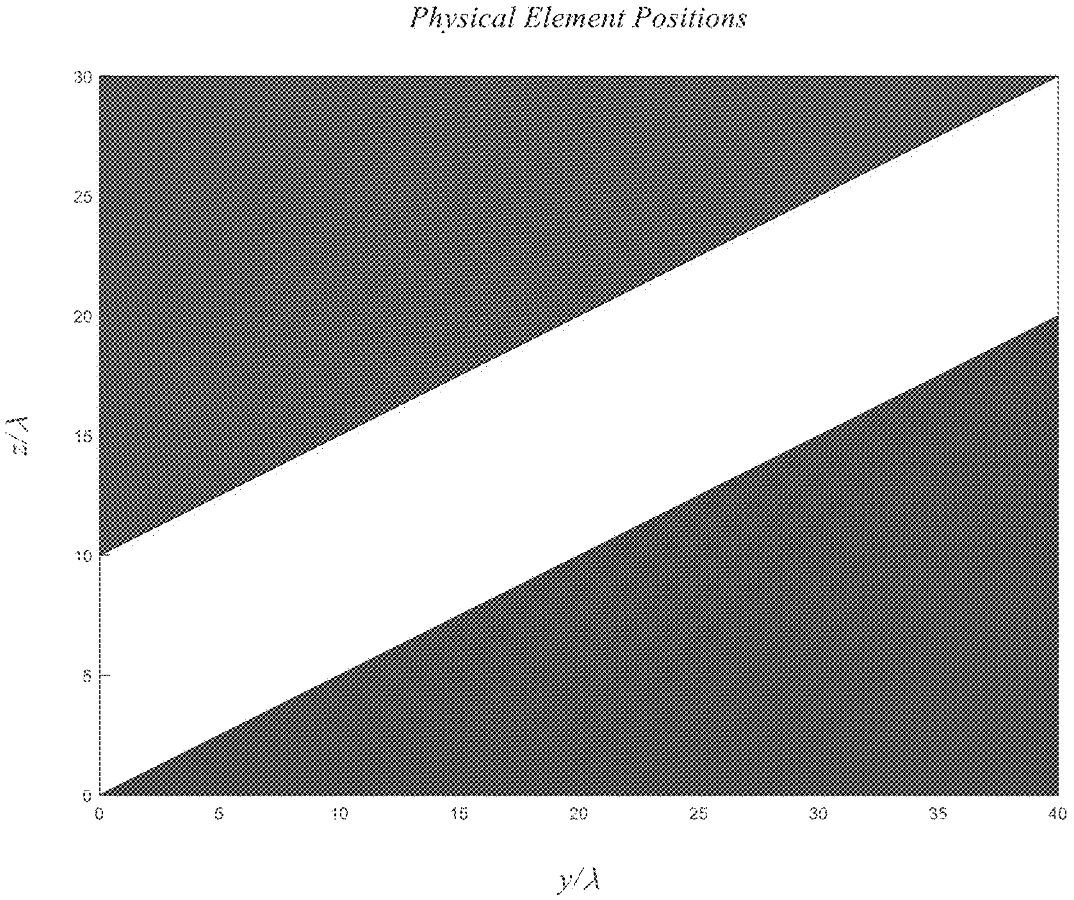
FIGS. 14A and 14B are diagrams of exemplary physical antenna element positions in an embodiment of the present invention.
Figure 14B:
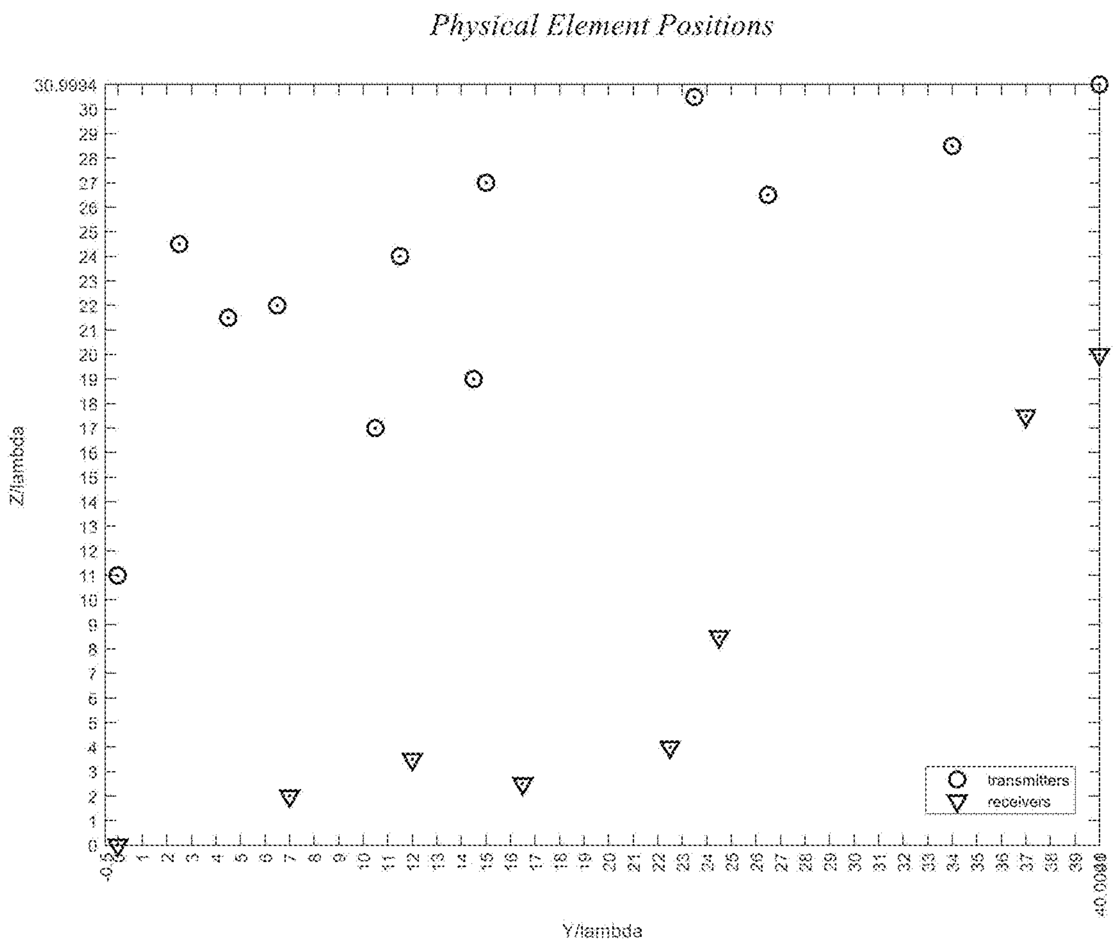
Figure 14C:
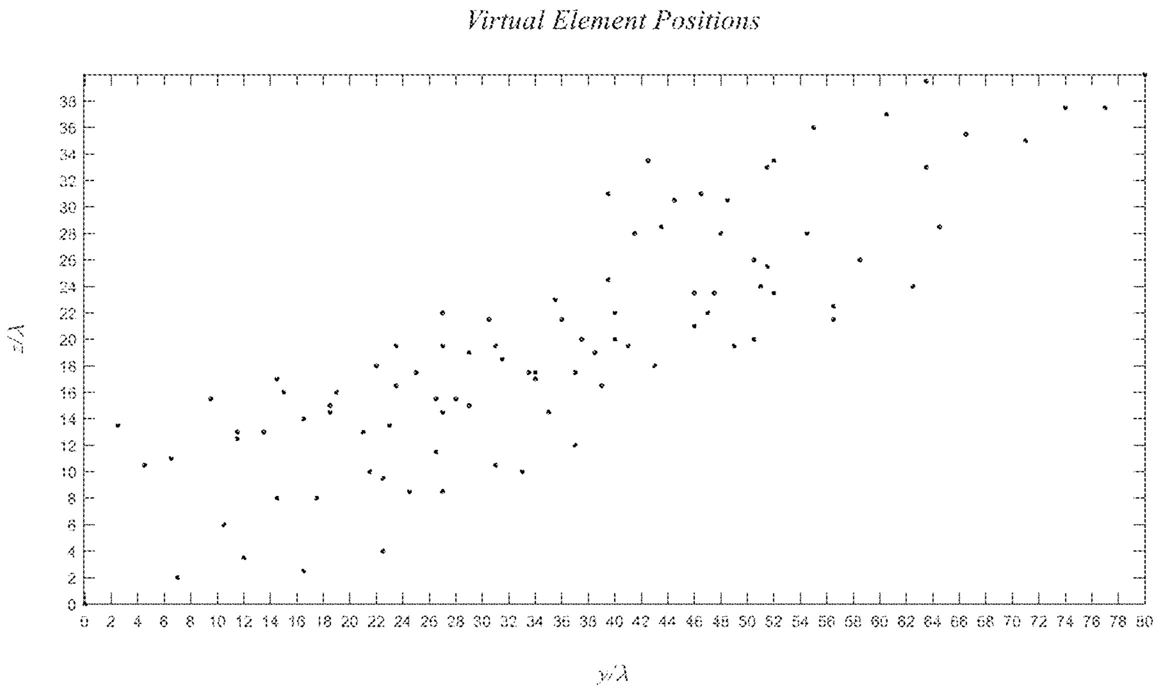
FIG. 14C is a diagram of exemplary virtual element positions in an embodiment of the present invention.
Figure 14D:
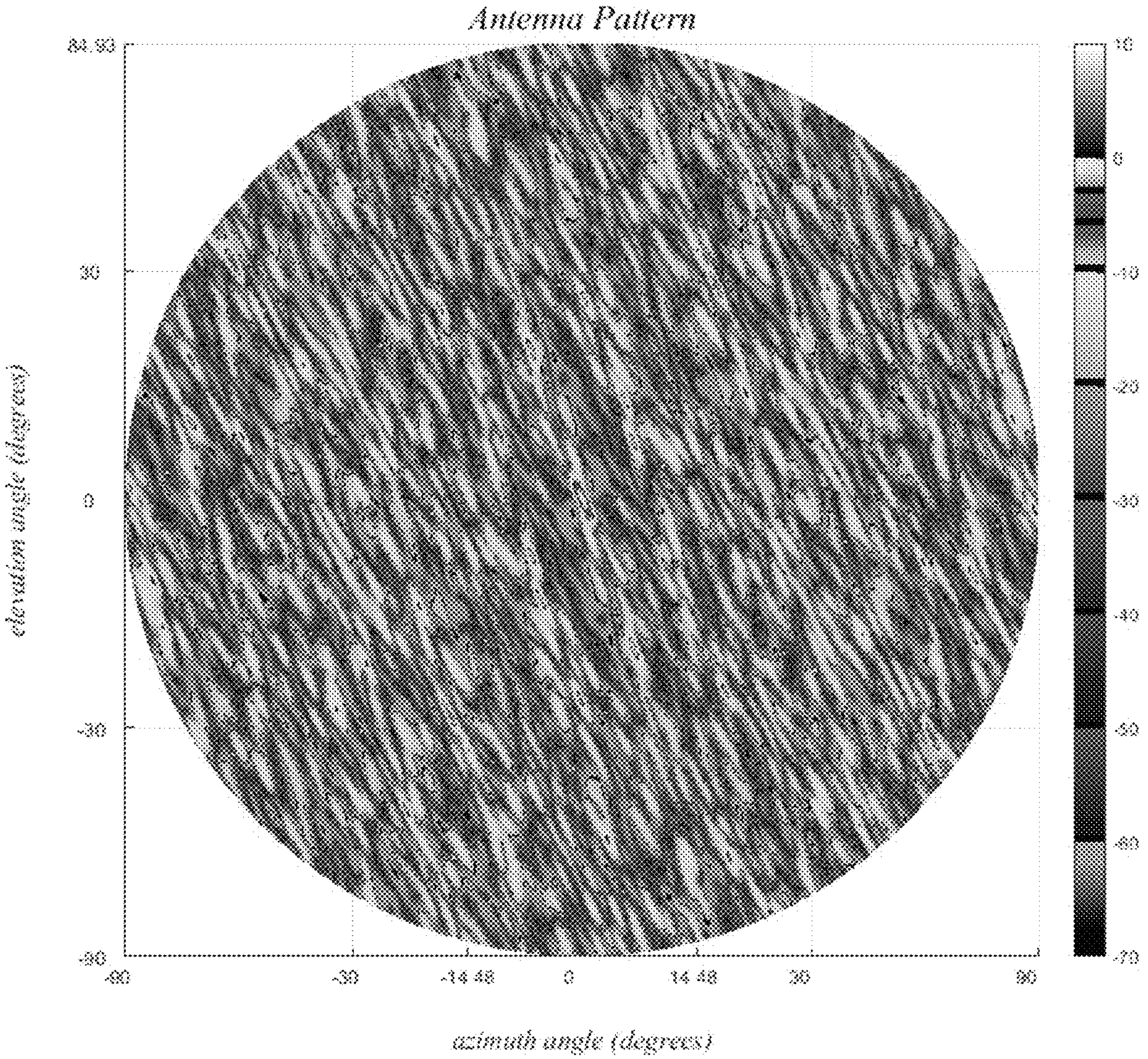
FIGS. 14D, 14E, and 14F are diagrams of exemplary antenna patterns in an embodiment of the present invention.
Figure 14E:
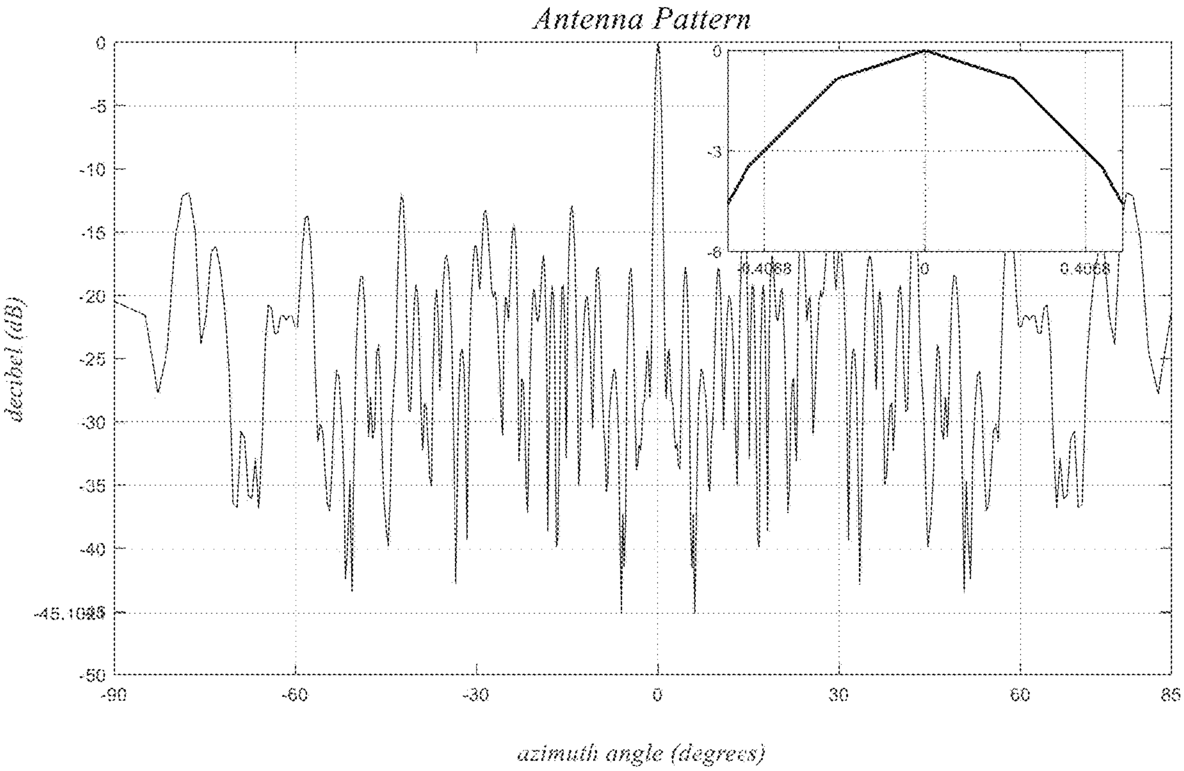
Figure 14F:
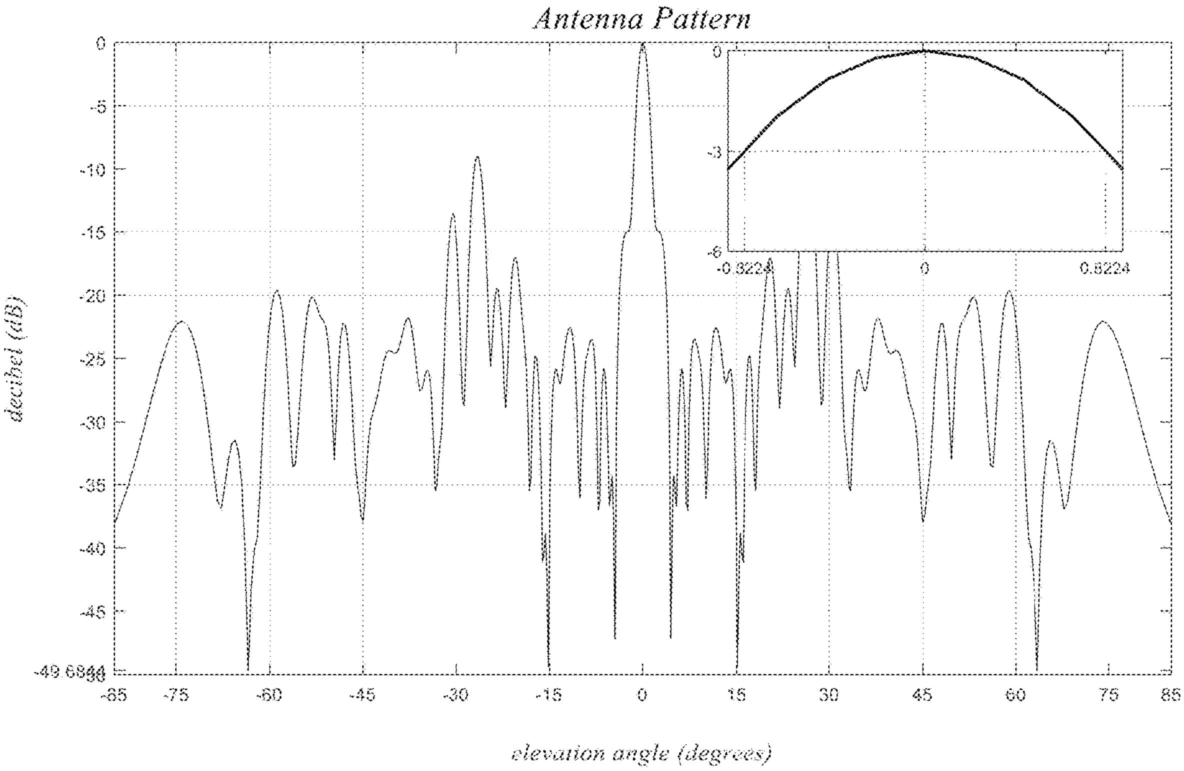

FIG. 14A illustrates an exemplary transmitter and receiver element grouping with mutual coupling distance restrictions of 20λ and 10λ for horizontal and vertical, respectively, FIG. 14B illustrates an exemplary sparse array's physical 12 transmitter and 8 receiver element positions as initial restriction to sparse array design, FIG. 14C illustrates an exemplary sparse array's physical 12 transmitter and 12 receiver element positions, which only 8 receivers are optimized for reducing mutual coupling, 8 receivers are forced by as the initial setting, FIG. 14D depicts the antenna pattern from the resulting sparse virtual array with 12×8=96 virtual elements; with FIGS. 14E, 14F, and 14G illustrating 2D, 1D-azimuth and 1D-elevation antenna patterns for exemplary mutual coupling restricted sparse array for a target at broadside, respectively. Side lobes can further be reduced using differential beam forming.

Figure 15A:
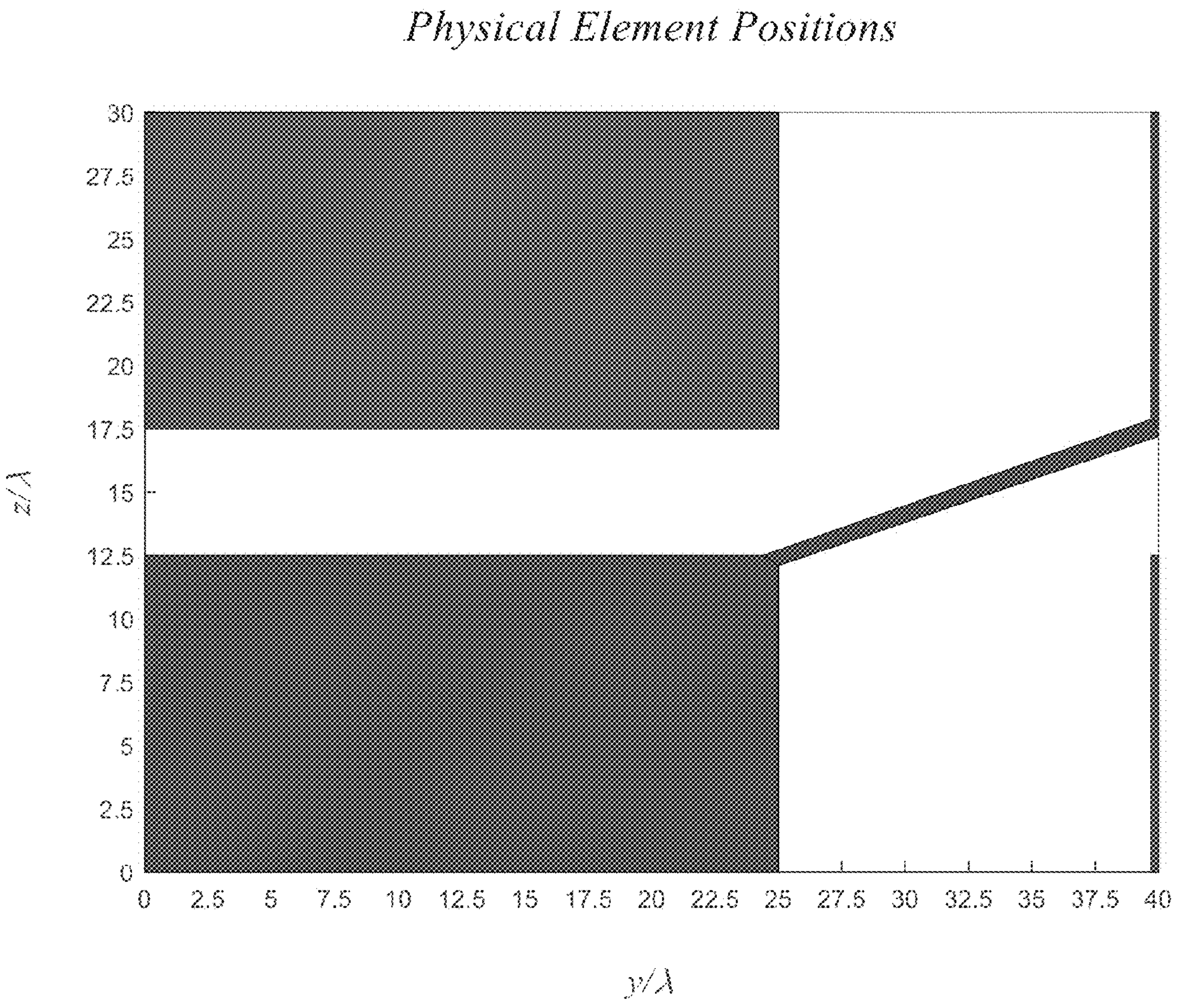
FIGS. 15A, 15B, and 15C are diagrams of exemplary physical antenna element positions in an embodiment of the present invention.
Figure 15B:
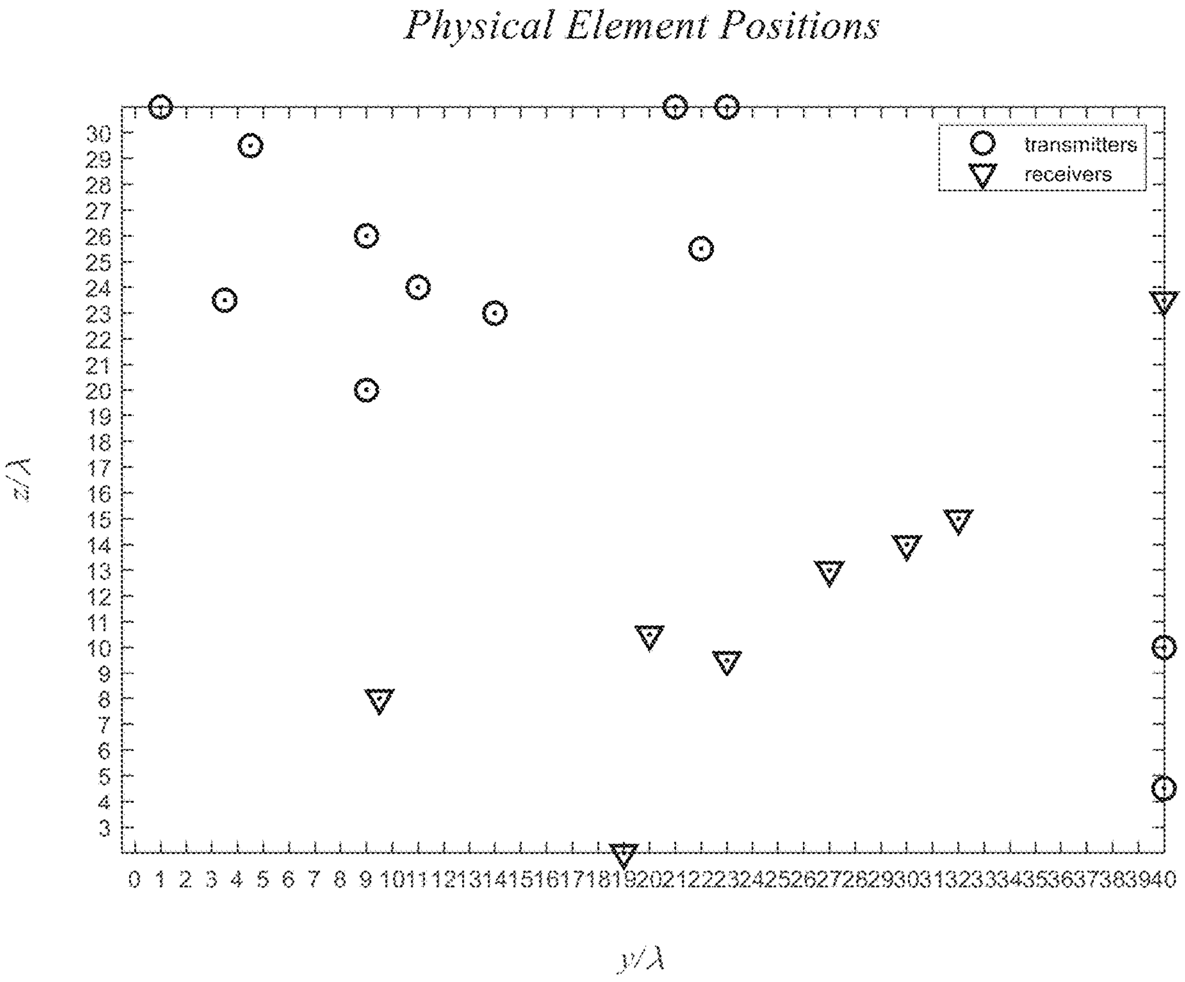
Figure 15C:
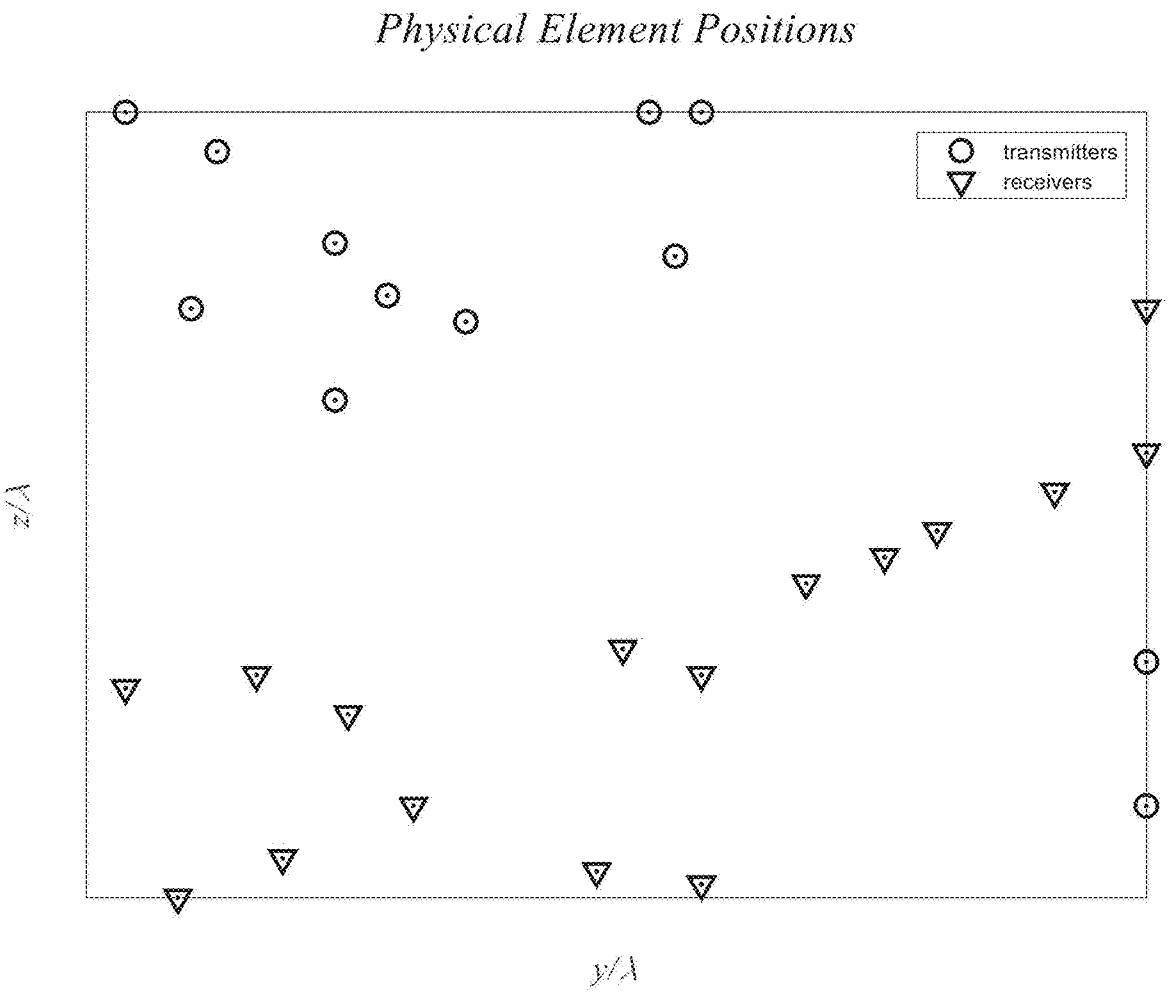
Figure 15D:
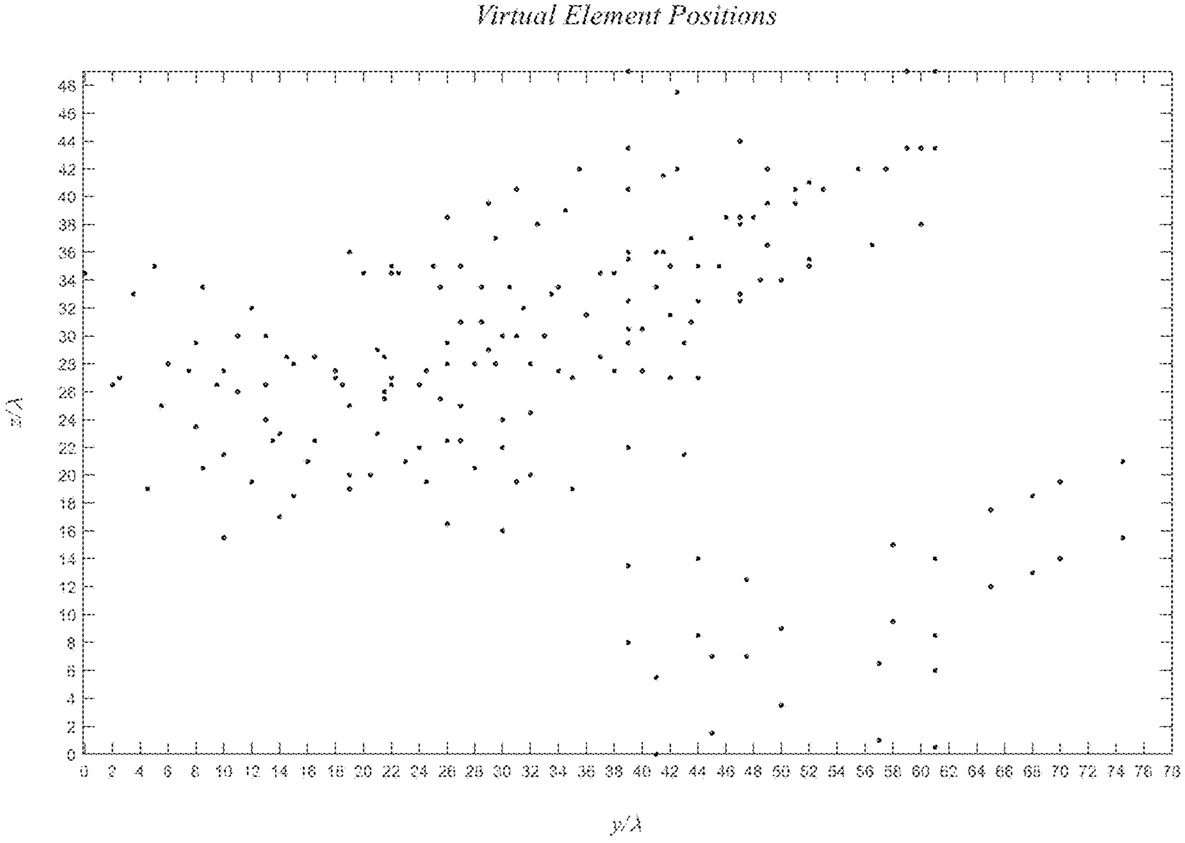
FIG. 15D is a diagram of exemplary virtual element positions in an embodiment of the present invention.
Figure 15E:
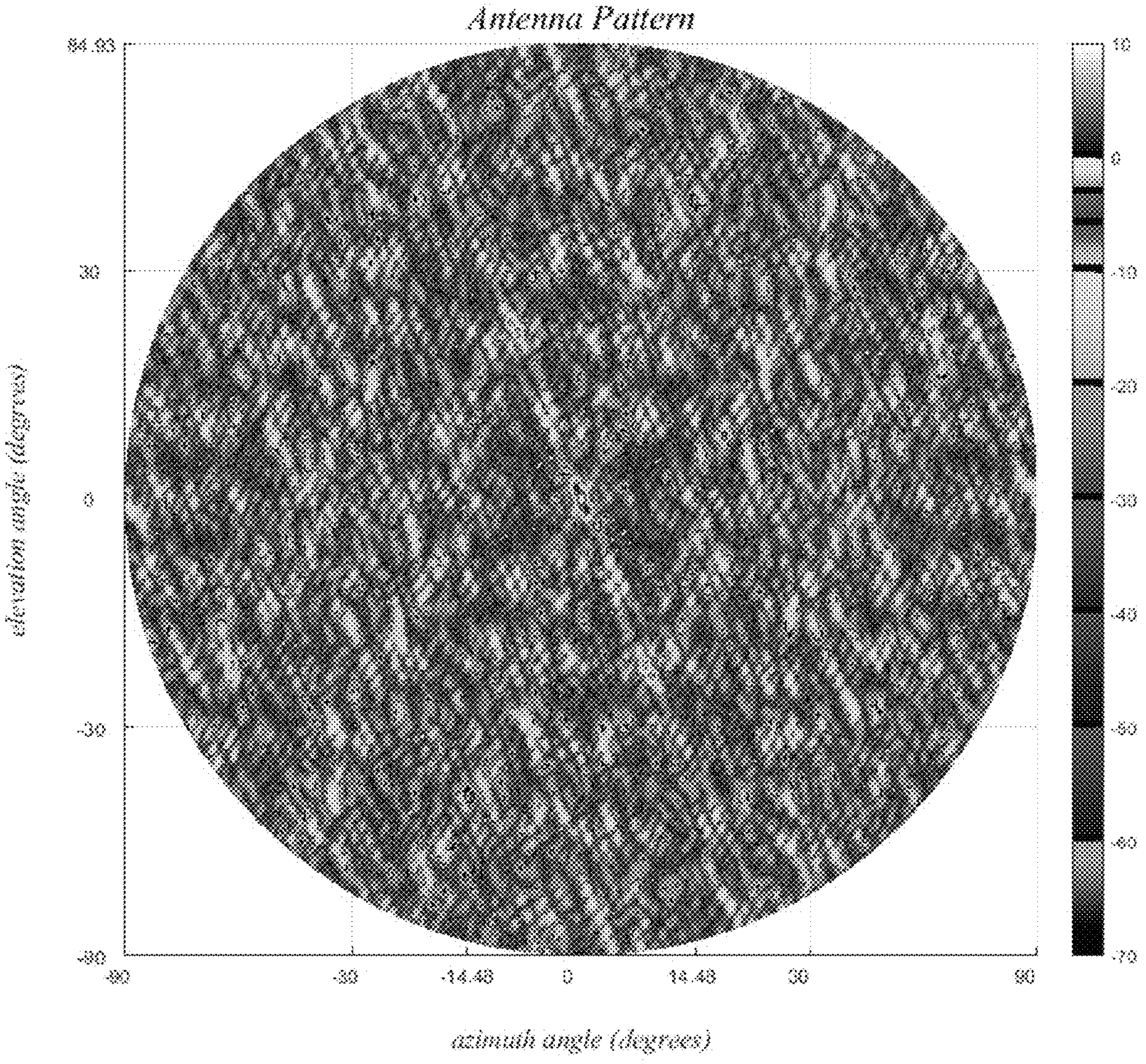
FIGS. 15E, 15F, and 15G are diagrams of exemplary antenna patterns in an embodiment of the present invention.
Figure 15F:
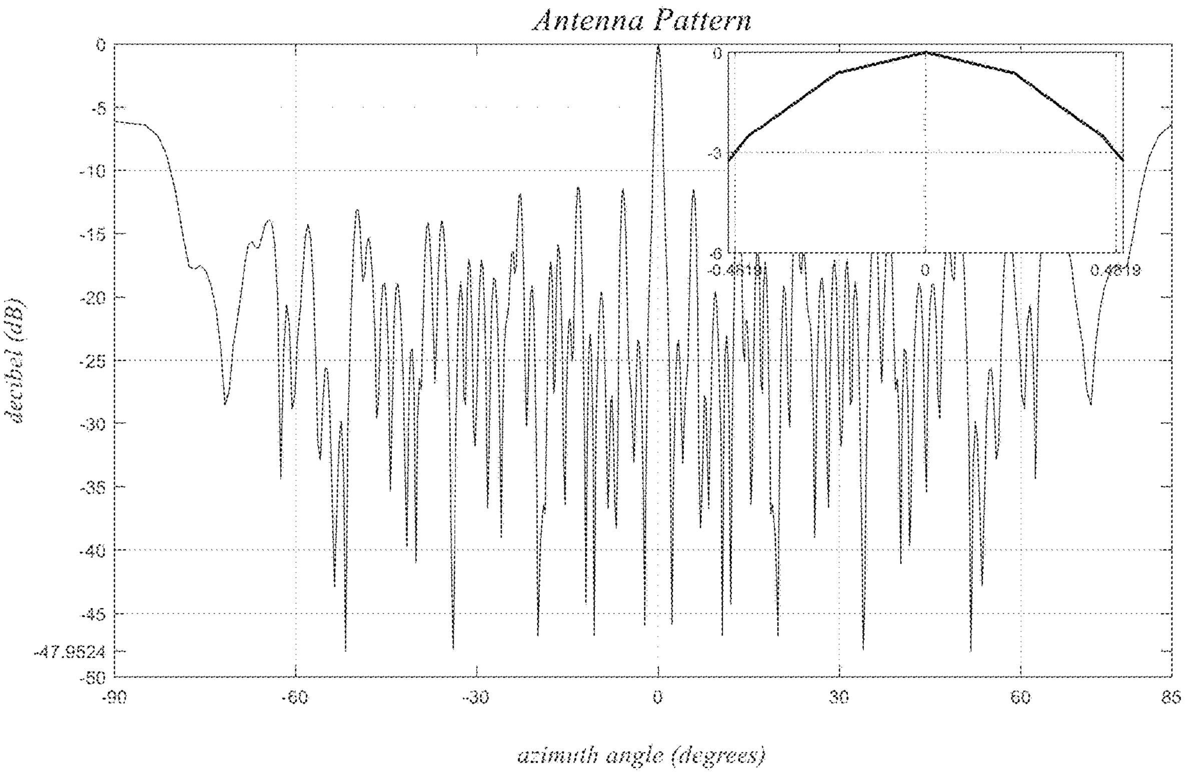
Figure 15G:
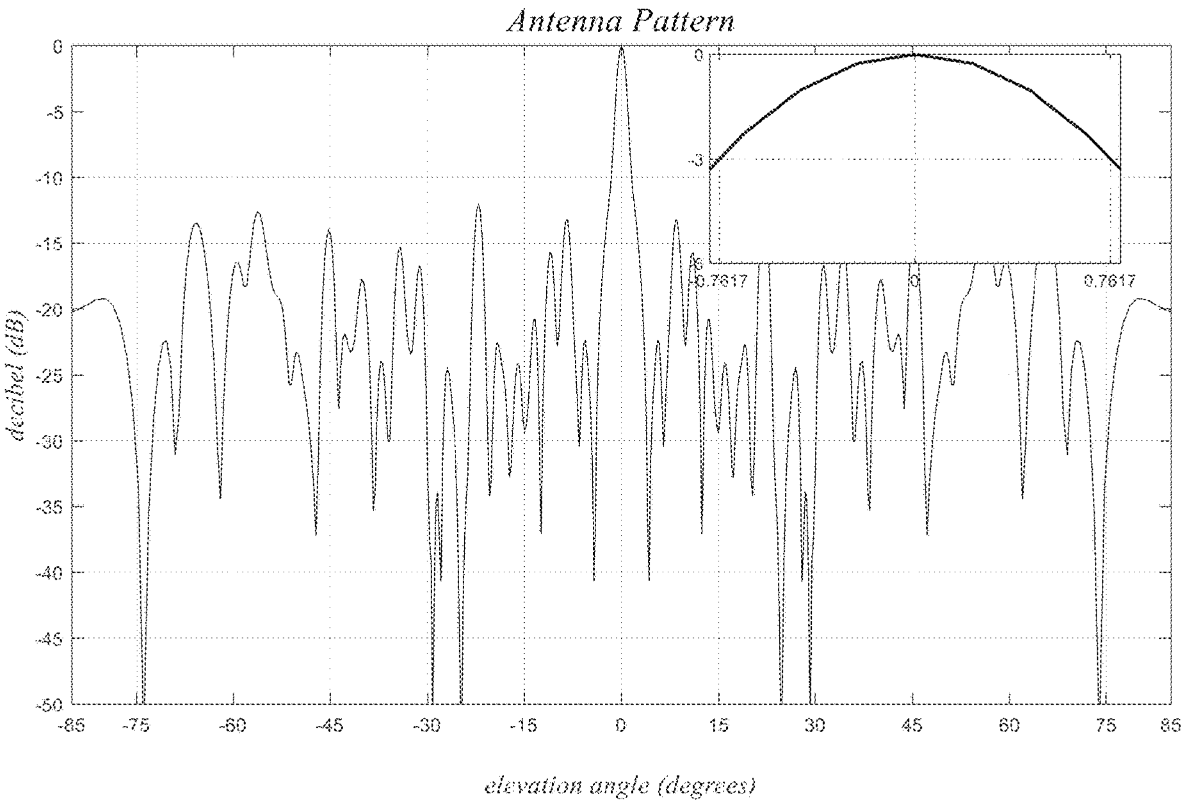

FIG. 15A illustrates and exemplary transmitter and receiver element grouping with mutual coupling distance restrictions of 15λ and 10λ for horizontal and vertical, respectively, FIG. 15B illustrates an exemplary initial enforcement of 12 transmitters and 8 receivers, FIG. 15C illustrates the sparse array's physical 12 transmitter and 16 receiver element positions with restricted by mutual coupling distance, FIG. 15D illustrates the resulting sparse virtual array with 12×16=192 virtual elements, FIG. 15E illustrates the antenna pattern for exemplary mutual coupling restricted sparse array, FIGS. 15F and 15G illustrate exemplary horizontal and vertical cross sections of antenna pattern of target angle at the broadside. Side lobes can further be reduced using differential beam forming.

Accordingly, an exemplary radar sensing system utilizing a sparse array antenna structure provides an enhanced angular resolution to detect multiple targets with improved accuracy beyond the abilities of conventional radar. The exemplary radar system uses sparsely located antenna array elements allowing improved FOV, angular resolution, beam width, and side lobes using fewer physical antenna elements. Sparse antenna arrays allow the use of physically larger elements, larger separation between transmitter and receiver elements to reduce mutual coupling, and fewer elements to reduce necessary computations.

Changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. A radar sensing system comprising:

a transmit antenna array and a receive antenna array;

a plurality of transmitters configured to transmit radio signals, wherein each transmitter is communicatively coupled to an associated transmit antenna of the transmit antenna array;

a plurality of receivers configured to receive radio signals that include transmitted radio signals transmitted by the transmitters and reflected from objects in an environment, wherein each receiver is communicatively coupled to an associated receive antenna of the transmit antenna array;

wherein at least one of the transmit antenna array and the receive antenna array is arranged as a sparse antenna array configured to provide an angular resolution sufficient to detect multiple targets, wherein the sparse antenna array comprises antenna elements which are arranged as sparsely located antenna array elements with selected separation distances for a selected angular resolution for the transmitters and receivers, wherein the selected separation distances of the sparsely located antenna array elements define at least in part an arrangement of the sparsely located antenna array elements for the selected angular resolution, wherein the sparse antenna array comprises physical antenna elements and virtual antenna elements, wherein the sparse antenna array is configured such that the arrangement of the sparsely located antenna array elements comprises a random arrangement of virtual antenna elements of the sparse antenna array, and wherein the random arrangement of virtual antenna elements is an arrangement of virtual antenna elements randomly selected from a plurality of virtual antenna element arrangements.

2. The radar sensing system of claim 1, wherein the arrangement of the sparsely located antenna array elements results in a selected field of view (FOV), angular resolution, beam width, and side lobes using fewer physical antenna elements than in an alternate physical antenna element arrangement defined by minimum separation distance or spacing requirements for the desired angular resolution.

3. The radar sensing system of claim 2, wherein each of the sparsely located antenna array elements are each physically larger than the elements of the alternate physical antenna element arrangement, wherein a selected separation of transmitter elements and receiver elements of the sparsely located antenna array elements reduces mutual coupling.

4. The radar sensing system of claim 1, wherein the sparsely located antenna array elements are arranged to form corresponding virtual elements which are spread irregularly in the azimuthal and elevation directions to minimize sidelobes.

5. The radar sensing system of claim 4, wherein the sparsely located antenna array elements comprise physical elements which are positioned with no physical overlaps on grids formed by a minimum spacing value of design, which design is smaller than this physical size of physical element arrangement, and wherein the virtual elements are spread to a selected antenna aperture to increase angular resolution, and wherein virtual transmitter groups and virtual receiver groups are separated on the selected antenna aperture to reduce mutual coupling.

6. The radar sensing system of claim 1, wherein each of the antennas of at least one of the transmit antenna array and the receive antenna array comprise multiple antenna elements.

7. The radar sensing system of claim 6, wherein the multiple antenna elements of an antenna are arranged as a linear array to provide radar target resolution only in azimuth.

8. The radar sensing system of claim 6, wherein the multiple antenna elements of an antenna are arranged as a two-dimensional array to provide target resolution in both azimuth and elevation, separately.

9. The radar sensing system of claim 1, wherein each receiver of the plurality of receivers comprises:

a low-noise amplifier configured to amplify a received radio signal of the received radio signals;

a local oscillator configured to commonly drive I-Q mixers configured to downconvert the amplified radio signal to a quadrature (IQ) baseband signal;

a filter configured to baseband filter the baseband signal; and a programmable gain adjustment module configured to adjust the gain of the filtered baseband signal.

10. The radar sensing system of claim 1, wherein each of the receivers is configured to process the received radio signals to correlate received signal samples to digital values representing each transmitters modulation to produce a different number or set of correlations corresponding to different echo delays, wherein there exists one set of correlations for each receiver-transmitter combination.

11. The radar sensing system of claim 1, wherein the transmit antenna array and the receive antenna array are a first antenna array that is time shared between the transmitters and the receivers, wherein the first antenna array is configured as the transmit antenna array when the transmitters are transmitting, and wherein the first antenna array is configured as the receive antenna array when the receivers are receiving, and wherein the transmitters and receivers operate in separate, alternating, operational periods of time.

12. A method for selecting an arrangement of physical antenna elements and a randomly selected arrangement of virtual antenna elements for a proposed antenna array that is an optimum array arrangement selection for the proposed antenna array, wherein the method comprises:

defining selected antenna array properties comprising at least one of dimension, available number of physical antenna elements, beam width, and maximum sidelobe level;

calculating inter-element spacings and aperture lengths for the proposed antenna array as defined by a selected field-of-view (FOV) and beamwidth (BW), respectively;

calculating reference full-grid element locations as defined by the selected FOV and BW;

finding candidate element locations for a plurality of candidate element arrangements of the virtual antenna elements as defined by the selected antenna array properties and calculated inter-element spacing and aperture lengths;

randomly selected a candidate element arrangement of virtual element locations from among a plurality of candidate element arrangements of virtual element locations that meet the defined selected antenna array properties and the calculated inter-element spacings and aperture lengths;

calculating maximum sidelobe level (SLL) in the FOV for the randomly selected candidate element arrangement of the virtual antenna elements;

randomly selecting additional candidate element arrangements of virtual element locations from among the plurality of candidate element arrangements of virtual element locations for an updated candidate element arrangement of the virtual antenna elements and recalculating the SLL for each updated candidate element arrangement of the virtual antenna elements until a selected candidate element arrangement of the virtual antenna elements is reached that meets the desired FOV and BW and has a resultant SLL that is below a threshold value;

stopping the random selection of additional candidate element arrangements of virtual element locations of the virtual antenna elements and defining the selected candidate element arrangement as the selected arrangement of virtual antenna elements and physical antenna elements of the proposed antenna array when the selected candidate element arrangement of the virtual antenna elements results in a calculated SLL that is within a difference threshold value of an SLL value from the previous random candidate element arrangement of virtual element locations selection step, wherein the optimum array arrangement of virtual antenna elements and physical antenna elements is the selected arrangement of virtual antenna elements and physical antenna elements of the proposed antenna array; and providing for a radar system, an antenna array that comprises the selected arrangement of virtual antenna elements and physical antenna elements of the proposed antenna array.

13. The method of claim 12, wherein each of the plurality of candidate element arrangements of virtual element locations comprises one or more required element locations that are a priori determined to be required locations as defined by the optimum array arrangement, and wherein the required element locations are selected before any other element locations are selected and before a candidate element arrangement of virtual element locations is randomly selected.

14. The method of claim 12, wherein additional antenna array properties comprise at least one of physical size limitations for transmit elements and receive elements, forbidden mutual coupling zone between transmit and receive element, and a list of required element locations that are a priori determined to be required as defined by the element arrangement.

15. The method of claim 12, wherein additional antenna array properties comprise physical element size limitations.

16. The method of claim 12, wherein the optimum array solution for a sparse antenna array is further defined by at least a selected FOV, BW, and number of elements, and resultant SLL, and wherein each of the randomly selected candidate element arrangements of virtual element locations are evaluated with at least the selected FOV, BW, and number of elements, and resultant SLL, such that the optimum array solution for the selected arrangement of the physical antenna elements of the proposed antenna array and its arrangement of virtual antenna elements will be defined by at least the selected FOV, BW, and number of elements, and the resultant SLL for the proposed antenna array and its arrangement of virtual antenna elements.

* * * * *